US010336891B2

(12) United States Patent
Slater

(10) Patent No.: US 10,336,891 B2
(45) Date of Patent: Jul. 2, 2019

(54) METHODS AND COMPOSITIONS RELATED TO RECYCLING POLYMER WASTE

(71) Applicant: Imerys Minerals Limited, Par Cornwall (GB)

(72) Inventor: John Slater, St. Austell (GB)

(73) Assignee: ImerTech SAS, Paris (FR)

( * ) Notice: Subject to any disclaimer, the term of this patent is extended or adjusted under 35 U.S.C. 154(b) by 0 days.

(21) Appl. No.: 15/950,643

(22) Filed: Apr. 11, 2018

(65) Prior Publication Data

US 2018/0298169 A1    Oct. 18, 2018

Related U.S. Application Data

(62) Division of application No. 14/009,312, filed as application No. PCT/EP2012/061722 on Jun. 19, 2012, now Pat. No. 9,969,868.

(30) Foreign Application Priority Data

Jun. 20, 2011 (EP) .................................. 11290277

(51) Int. Cl.
| | | |
|---|---|---|
| *C08L 23/02* | (2006.01) | |
| *C08L 23/06* | (2006.01) | |
| *C08J 11/04* | (2006.01) | |
| *C09C 1/02* | (2006.01) | |

(Continued)

(52) U.S. Cl.
CPC ............... *C08L 23/06* (2013.01); *C08J 11/04* (2013.01); *C08L 23/02* (2013.01); *C08L 23/04* (2013.01); *C08L 23/10* (2013.01); *C09C 1/021* (2013.01); *C01P 2004/51* (2013.01); *C01P 2004/61* (2013.01); *C08J 2323/02* (2013.01);

*C08L 2207/20* (2013.01); *Y02P 20/143* (2015.11); *Y02W 30/70* (2015.05); *Y10T 428/1372* (2015.01)

(58) Field of Classification Search
CPC .......... C08L 23/06; C08L 23/04; C08L 23/10; C08L 23/02; C08L 2207/20; C09C 1/021; C08J 11/04; C08J 2323/02; Y02P 20/143; Y10T 428/1372; C01P 2004/51; C01P 2004/61

See application file for complete search history.

(56) References Cited

U.S. PATENT DOCUMENTS

| | | |
|---|---|---|
| 3,471,439 A | 10/1969 | Bixler et al. |
| 3,888,912 A | 6/1975 | Burguette |
| 4,267,365 A | 5/1981 | Findeisen |

(Continued)

FOREIGN PATENT DOCUMENTS

| | | |
|---|---|---|
| CN | 1646617 A | 7/2005 |
| CN | 1650069 A | 8/2005 |

(Continued)

OTHER PUBLICATIONS

Definition of the term "Tallow Fatty Acids", http://chemicalland21.com/industrialchem/IUH/TALLOW%20FATTY%20ACIDS.htm.

(Continued)

*Primary Examiner* — Michael C Miggins
(74) *Attorney, Agent, or Firm* — Finnegan, Henderson, Farabow, Garrett & Dunner LLP

(57) ABSTRACT

Polymer compositions, for example, recycled polymer compositions, processes for the production thereof, functional fillers for use in the polymer compositions, and articles formed from the polymer compositions.

9 Claims, 8 Drawing Sheets

(51) Int. Cl.
*C08L 23/04* (2006.01)
*C08L 23/10* (2006.01)

(56) References Cited

U.S. PATENT DOCUMENTS

| | | | |
|---|---|---|---|
| 5,124,373 | A | 6/1992 | Baumgaertel |
| 5,225,137 | A | 7/1993 | Sadr |
| 5,424,013 | A | 6/1995 | Lieberman |
| 5,569,713 | A | 10/1996 | Lieberman |
| 6,217,804 | B1 | 4/2001 | Lieberman |
| 6,342,100 | B1 | 1/2002 | Nover et al. |
| 7,732,514 | B2 | 6/2010 | Rothon et al. |
| 2009/0048403 | A1 | 2/2009 | Costantini |

FOREIGN PATENT DOCUMENTS

| | | |
|---|---|---|
| DE | 197 38 481 A1 | 3/1999 |
| EP | 0 614 948 A1 | 9/1994 |
| EP | 0 998 522 B1 | 5/1999 |
| EP | 0 696 618 B1 | 1/2000 |
| EP | 1 849 822 B1 | 9/2008 |
| EP | 2 264 108 A1 | 12/2010 |
| EP | 11 290 277 | 6/2011 |
| GB | 2 415 700 A | 1/2006 |
| JP | 46-40414 | 11/1971 |
| JP | 51-139846 | 12/1976 |
| JP | 64-033163 A | 2/1989 |
| JP | 3-7770 | 1/1991 |
| JP | 10-249859 | 9/1998 |
| JP | 10-278105 | 10/1998 |
| JP | 2001-191051 A | 7/2001 |
| JP | 2001-514321 | 9/2001 |
| JP | 2002-166421 A | 6/2002 |
| JP | 2004-231873 | 8/2004 |
| JP | 2005-067196 A | 3/2005 |
| JP | 2005-179688 A | 7/2005 |
| JP | 2005-520903 | 7/2005 |
| JP | 2006-070237 A | 3/2006 |
| JP | 2006-77144 | 3/2006 |
| JP | 2007-112913 A | 5/2007 |
| JP | 2007-291213 A | 11/2007 |
| JP | 2008-088285 A | 4/2008 |
| JP | 2009-24117 | 2/2009 |
| KR | 2003-0002657 | 1/2003 |
| TW | 553993 B | 9/2003 |
| WO | WO 92/15640 | 9/1992 |
| WO | WO 03/080720 A1 | 10/2003 |
| WO | WO 03/093577 A1 | 11/2003 |
| WO | WO 2009-099920 A2 | 8/2009 |
| WO | WO 2012/175504 A1 | 12/2012 |

OTHER PUBLICATIONS

Yilmaz, G ökhun, Thesis "Effects of Titanate Coupling Agents on Low Density Polyethylene and Polypropylene Blends and Composites," published Nov. 2008.

Sirin, Kamil; Balcan, Mehmet; and Dogan, Fatih, "The Influence of Filler Component on Mechanical Properties and Thermal Analysis of PP-LDPE and PP-LDPE/DAP Ternary Composites", *Polypropylene*, Chap. 18, 2012, pp. 345-356.

Can, S.; and Tan, S., "A Study on Thermal and Mechanical Properties of Mechanically Milled HDPE and PP", Proceedings of $3^{rd}$ BMC—2003 Ohrid, R. Macedonia, 2011, pp. 310-315.

Dikobe, D. G.; and Luyt, A. S., "Comparative study of the morphology and properties of PP/LLDPE/wood powder and MAPP/LLDPE/wood powder polymer blend composites", eXPRESS Polymer Letters, vol. 4, No. 11, 2010, pp. 729-741.

Office Action dated Sep. 7, 2015, in related Chinese Patent Application No. 201280040286.5.

Notice of Opposition dated Oct. 22, 2015, in related European Patent Application No. 13160881.2.

State Intellectual Property Office of China Search Report dated Mar. 24, 2016, in corresponding Chinese Application No. 201280040286.5 (2 pages).

Schofield, John; Sunderland, Pat; Thetford, Dean; Liauw, Chris; Bainbridge, Clint; and Kelly, Adrian, "Modifying and Upgrading the Performance of Mixed Polyolefin Wastes using Coupled Fillers", 7 pgs.

"Plastics recycling with the DRD system" *Drying and cleaning plant for reprocessing of plastics*, MAS—Maschinen und Anlagenbau Schultz GmbH, 8 pgs.

Bainbridge, Clint; Liauw, Chris; Lees, Graham; Rothon, Roger; Thetford, Dean; Schofield, John; and Sunderland, Pat, Filler-Bourne Reactive Compatibilisation of Mixed Polyolefin Post-Consumer—Polymer Waste: A More Viable Alternative to Separation? Lubrizol, Chemistry Innovation, Manchester Metropolitan University, 46 pgs.

Lubrizol—Application Data Sheet—Solplus® C800—Coupling Agent for Calcium Carbonate filled peroxy cured EPDM Rubbers (Feb. 2008) 2 pgs.

Lubrizol—Application Data Sheet—Solplus® C800—Coupling Agent for Calcium Carbonate filled Polyolefins (Feb. 2008) 4 pgs.

"New coupling agents enhance mechanical properties in filled polymers", Plastics Additives & Compounding, (Mar./Apr. 2005), pp. 38-42.

Schofield, John; Sunderland, Pat; Thetford, Dean; Liauw, Chris; Bainbridge, Clint; and Kelly, Adrian, Lubrizol, "Modifying and Upgrading the Performance of Mixed Polyolefin Wastes using Coupled Fillers" (2009) 30 pgs.

SOLPLUS C800 in Calcium Carbonate filled, peroxide-cured EPDM Rubbers for general purpose applications, 10 pgs.

Bainbridge, Clint; Liauw, Christopher; Lees, Graham; Rothon, Roger; Thetford, Dean; Sunderland, Patrick; and Schofield, John, Filler-Born Reactive Compatibilisation of Mixed Polyolefin Post-Consumer Polymer Waste: A More Viable Alternative to Separation (2008) 11 pgs.

Bainbridge, Clint, Liauw, Christopher; Lees, Graham; Rothon, Roger; Thetford, Dean; Schofield, John, and Sunderland, Patrick, "A Novel Approach to Polyolefin Recycling", Lubrizol, Manchester Metropolitan University, 41 pgs.

MMU / Lubrizol, PhD Project (Mar. 30, 2010).

TAPPI Monograph Series No. 30, "Paper Coating Pigments", pp. 34-35.

International Search Report and Written Opinion dated Jul. 19, 2012, in International Application No. PCT/EP2012/061722.

US 10,336,891 B2

METHODS AND COMPOSITIONS RELATED TO RECYCLING POLYMER WASTE

CLAIM FOR PRIORITY

This application is a Divisional of application Ser. No. 14/009,312, filed Nov. 1, 2013, which is a U.S. national stage entry under 35 U.S.C. § 371 from PCT International Application No. PCT/EP2012/061722, filed Jun. 19, 2012, which claims priority to and the benefit of the filing date of European Patent Application No. 11290277.0, filed Jun. 20, 2011, to each of which this application claims the benefit of priority, and the entirety of the subject matter of both of which is incorporated herein by reference.

TECHNICAL FIELD

The present invention is directed to polymer compositions, for example, recycled polymer compositions, to processes for the production thereof, to functional fillers for use in said compositions and to articles formed from the polymer compositions.

BACKGROUND

It is known to incorporate inorganic particulate fillers, such as ground inorganic minerals into polymer compositions for a variety of purposes. Approaches have been proposed to improve the compatibility of the inorganic filler and the polymer composition. For example, U.S. Pat. No. 7,732,514 describes a composition comprising a plastics material, an inorganic particulate solid such as aluminium hydrate and a coupling surface modifier. In coupling surface modifiers the modifier interacts with both the surface of the particulate filler and the polymer matrix.

In recent years, the recycling of polymer waste material has come to the fore. However, the recycling of polymer waste material has presented challenges which are not necessarily encountered during the preparation of polymer compositions derived from virgin polymer.

These challenges include the problem of contamination and soiling of the polymer waste resulting from its original use and during post-use collection and initial processing. Such contamination can be in the form of volatile and/or solid impurities. The presence of such contaminants imparts unpleasant odours to the polymer waste material and, if not properly removed, can adversely affect the quality of the final recycled polymer. Typically, polymer waste is treated in a single washing step to remove contaminants.

Further, polymer waste streams often comprise a mixture of different polymer types, e.g., polyethylene and polypropylene, which can present compatibility problems in recycled polymers prepared from such mixed polymer waste streams. Conventionally, therefore, greater focus is placed on the separation of polymers into their constituent types before further processing. However, such separation is technically arduous and therefore relatively expensive.

Thus, as the need to recycle polymer waste materials increases, there is a continuing need for the development of new methods and compositions for the economically viable processing of polymer waste materials into high quality polymer compositions and articles.

The present inventors have found new fillers for use in polymer compositions, particularly polymer compositions derived from post-consumer polymer waste, as well as new processes for recycling polymer waste materials, which address or at least ameliorate the aforementioned problems and which also enable the production of low odour, high quality recycled polymer compositions.

SUMMARY OF THE INVENTION

In accordance with a first aspect of the invention, there is provided a process for recycling post-consumer polymer waste material comprising:
   providing at least one post-consumer waste polymer;
   cleaning the post-consumer waste polymer
   providing a functional filler comprising
      i. an inorganic particulate; and
      ii. a coating comprising a first compound including a terminating propanoic group or ethylenic group with one or two adjacent carbonyl groups; and
   combining the post-consumer waste polymer and the functional filler to form a recycled polymer.

In accordance with a second aspect of the invention, there is provided a process for recycling polymer waste material comprising:
   providing at least one waste polymer;
   cleaning the waste polymer in a first process step;
   cleaning the waste polymer in a second process step;
   providing a functional filler including
      i. an inorganic particulate; and
      ii. a coating comprising a compound including a terminating propanoic group or ethylenic group with one or two adjacent carbonyl groups; and
   combining the waste polymer and the functional filler to form a recycled polymer.

In accordance with a third aspect of the invention, there is provided a process for recycling polymer waste material comprising:
   providing at least one waste polymer;
   dry cleaning the waste polymer;
   providing a functional filler including
      i. an inorganic particulate; and
      ii. a coating comprising a compound including a terminating propanoic group or ethylenic group with one or two adjacent carbonyl groups; and
   combining the waste polymer and the functional filler to form a recycled polymer.

In accordance with a fourth aspect of the present invention, there is provided a functional filler comprising:
   i. an inorganic particulate;
   ii. a coating on the surface of the inorganic particulate, wherein the coating comprises
      a first compound including a terminating propanoic group or ethylenic group with one or two adjacent carbonyl groups; and
      a second compound selected from the group consisting of one or more fatty acids and one or more salts of a fatty acid, and combinations thereof.

In accordance with a fifth aspect, there is provided a polymer composition, comprising:
   at least one polymer; and
   a functional filler including
      i. an inorganic particulate; and
      ii. a coating on the surface of the inorganic particulate, wherein the coating comprises:
         a first compound including a terminating propanoic group or ethylenic group with one or two adjacent carbonyl groups,
      with the proviso that when the at least one polymer is not recycled from polymer waste in accordance with one or other of the processes of the first, second or third aspects of the present invention, the coating additionally comprises a second compound selected from the group consisting of stearic acid and a stearate.

In accordance with a sixth aspect, the present invention is directed to use of a functional filler as defined in accordance with the first, second or third aspects of the present invention in a recycled polymer derived from at least one waste polymer, wherein the at least one waste polymer is cleaned, for example (solvent-free) dry cleaned, in accordance with the first, second or third aspects of the present invention.

In accordance with a seventh aspect, the present invention is directed to a functional filler comprising an inorganic particulate; and a coating comprising a first compound including a terminating propanoic group or ethylenic group with one or two adjacent carbonyl groups. The inorganic particulate has a $d_{50}$ of from about 0.5 to about 1.5 µm. Optionally the inorganic particulate is ground calcium carbonate. Optionally the first compound is present in the functional filler in an amount of from about 0.6 to about 1.2 wt. %. The inorganic particulate may have a $d_{50}$ of from about 0.5 to about 1.0 µm.

In accordance with an eighth aspect, there is provided an article of manufacture formed from the polymer composition of the fifth aspect of the present invention.

In accordance with a ninth aspect, there is provided a composition comprising at least one polymer, a functional filler according to fourth or seventh aspects of the present invention, and optionally a peroxide-containing additive, for example, di-cumyl peroxide or 1,1-Di(tert-butylperoxy)-3,3,5-trimethylcyclohexane.

In accordance with a tenth aspect, there is provided the use of a functional filler according to the seventh aspect of the present invention in a polymer composition (optionally wherein the polymer composition comprises a mixture of at least two different polymer types) for improving the notched Charpy impact property of a moulded component formed from the polymer composition. The functional filler is present in the polymer composition in an amount ranging from about 5% to about 50% by weight of the polymer composition.

DETAILED DESCRIPTION

Processes of the Invention

Figure 1:
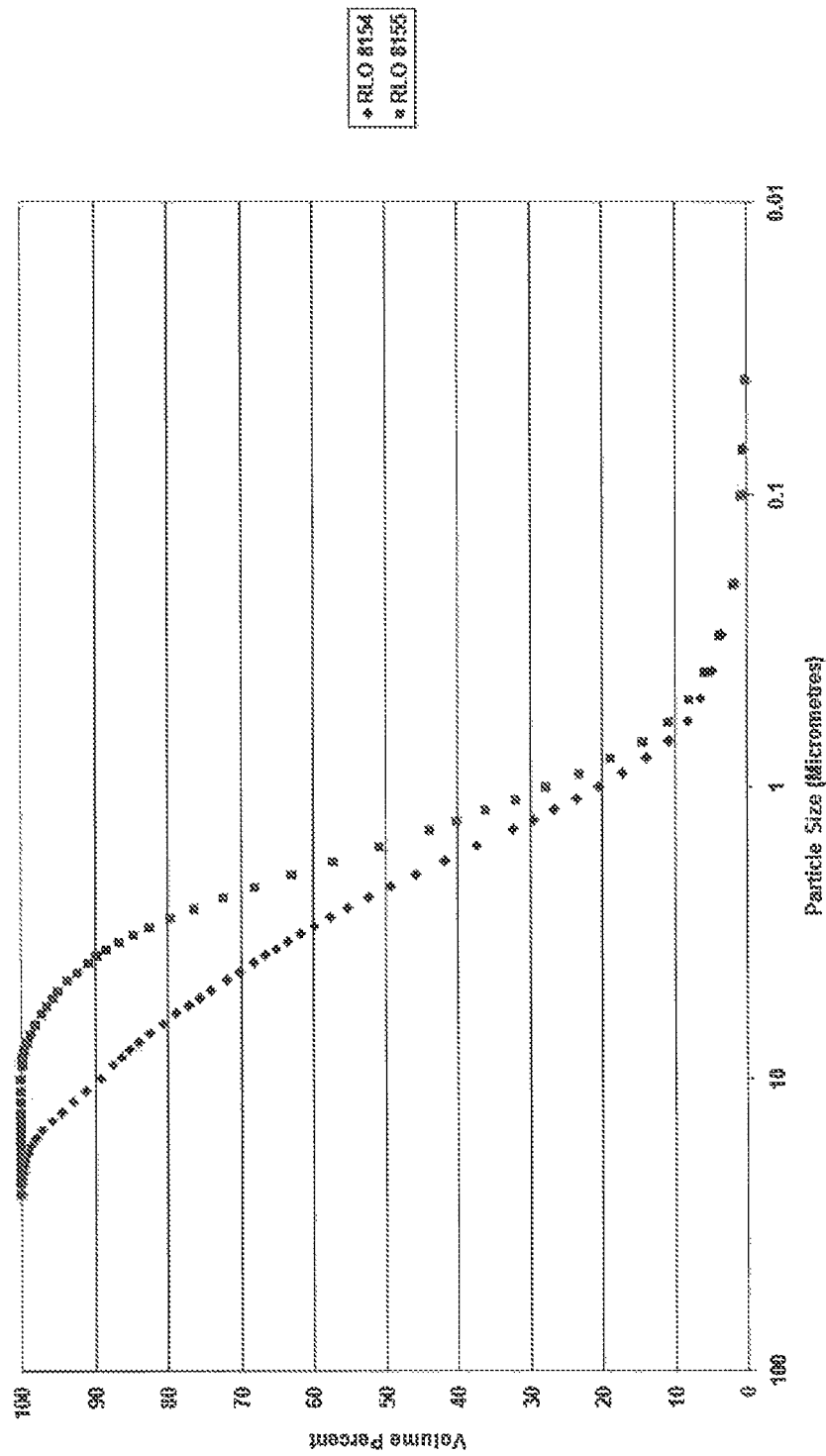
FIG. 1 depicts the particle size distribution of the dry ground and wet ground calcium carbonates used in Example 1.
Figure 2:
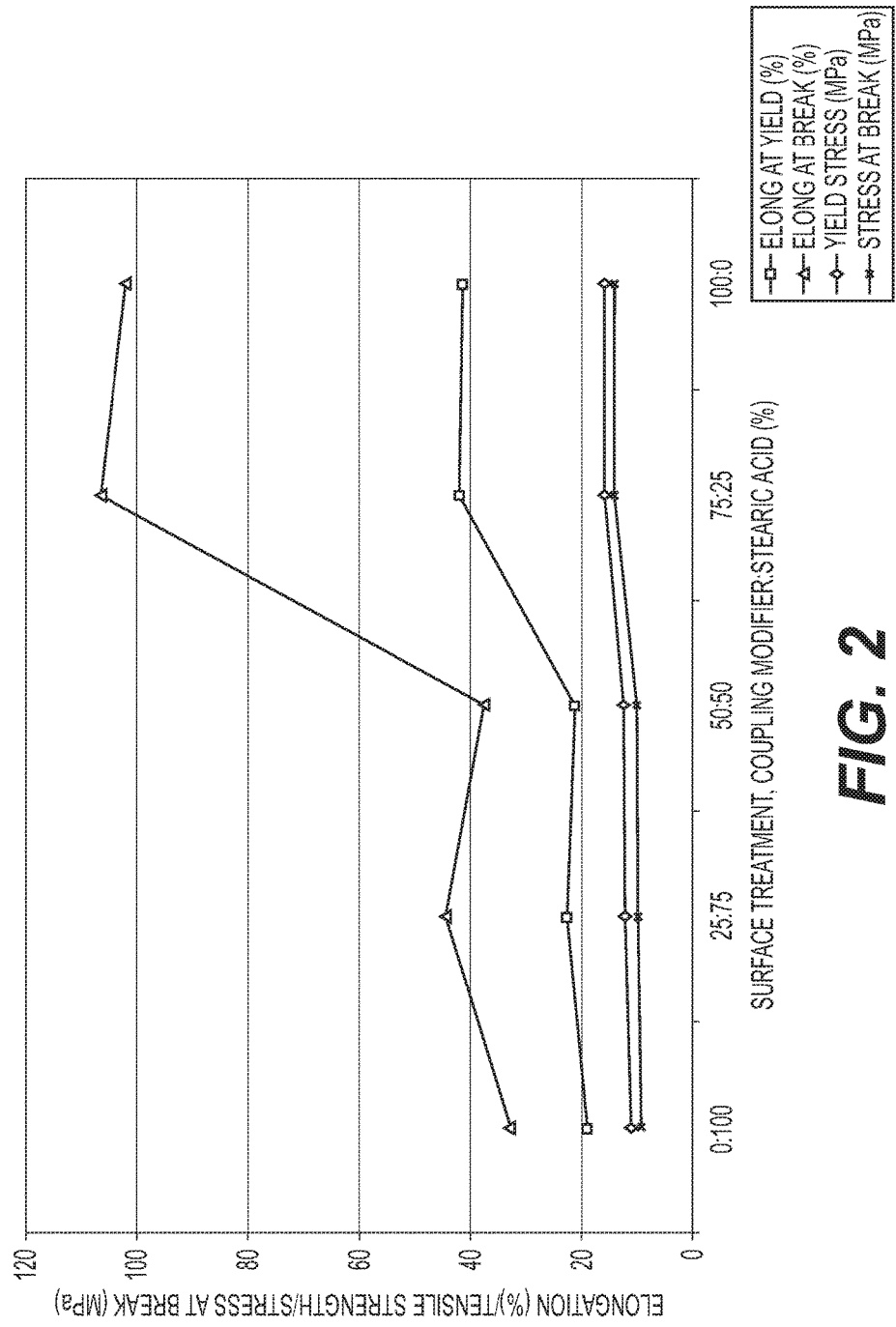
FIG. 2 is a graph summarizing various tensile properties of compounded materials comprising the coated wet ground carbonate of FIG. 1, as prepared in the Example 1.
Figure 3:
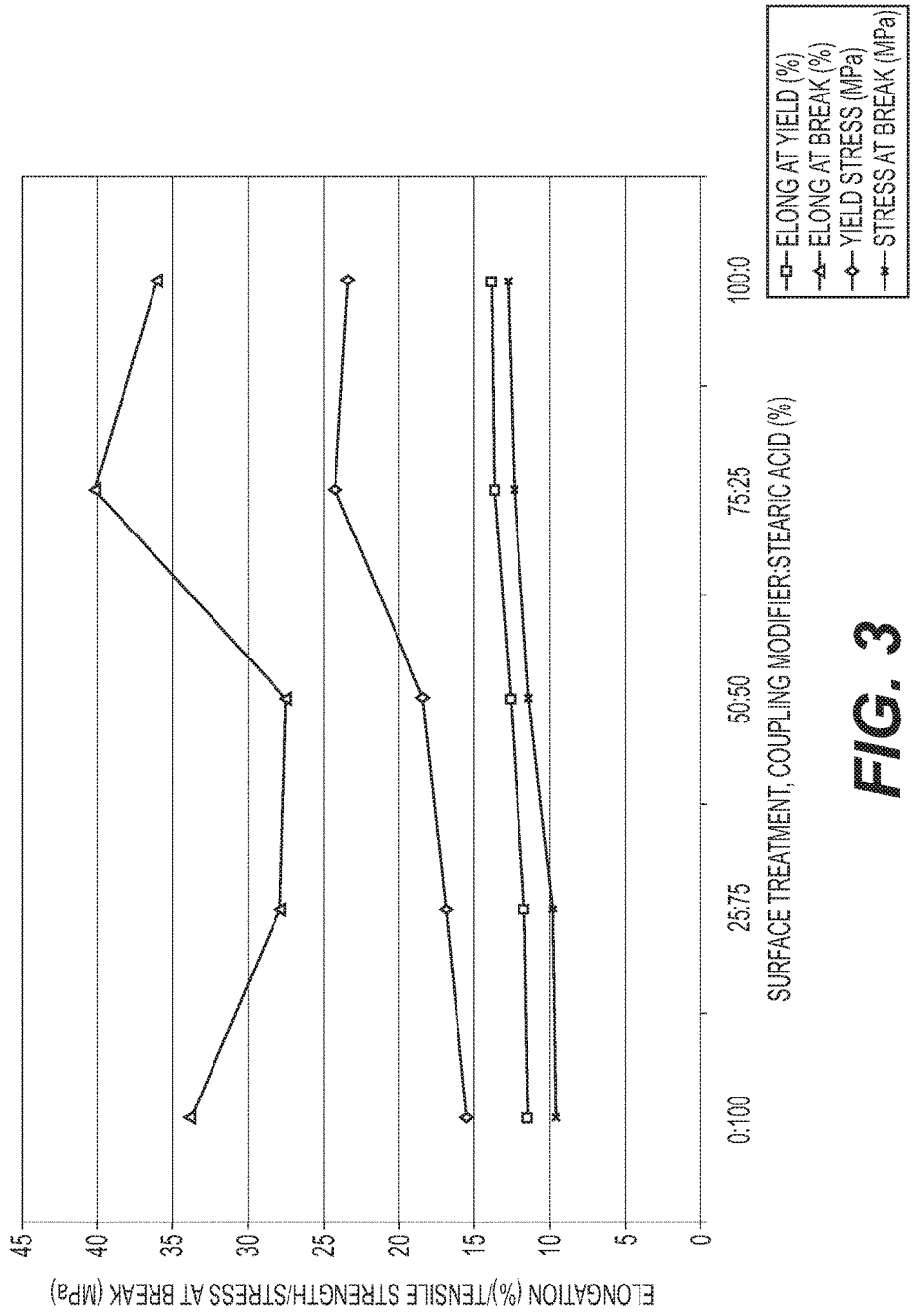
FIG. 3 is a graph summarizing various tensile properties of compounded polymer materials comprising the coated dry ground carbonate of FIG. 1, as prepared in Example 1.
Figure 4:
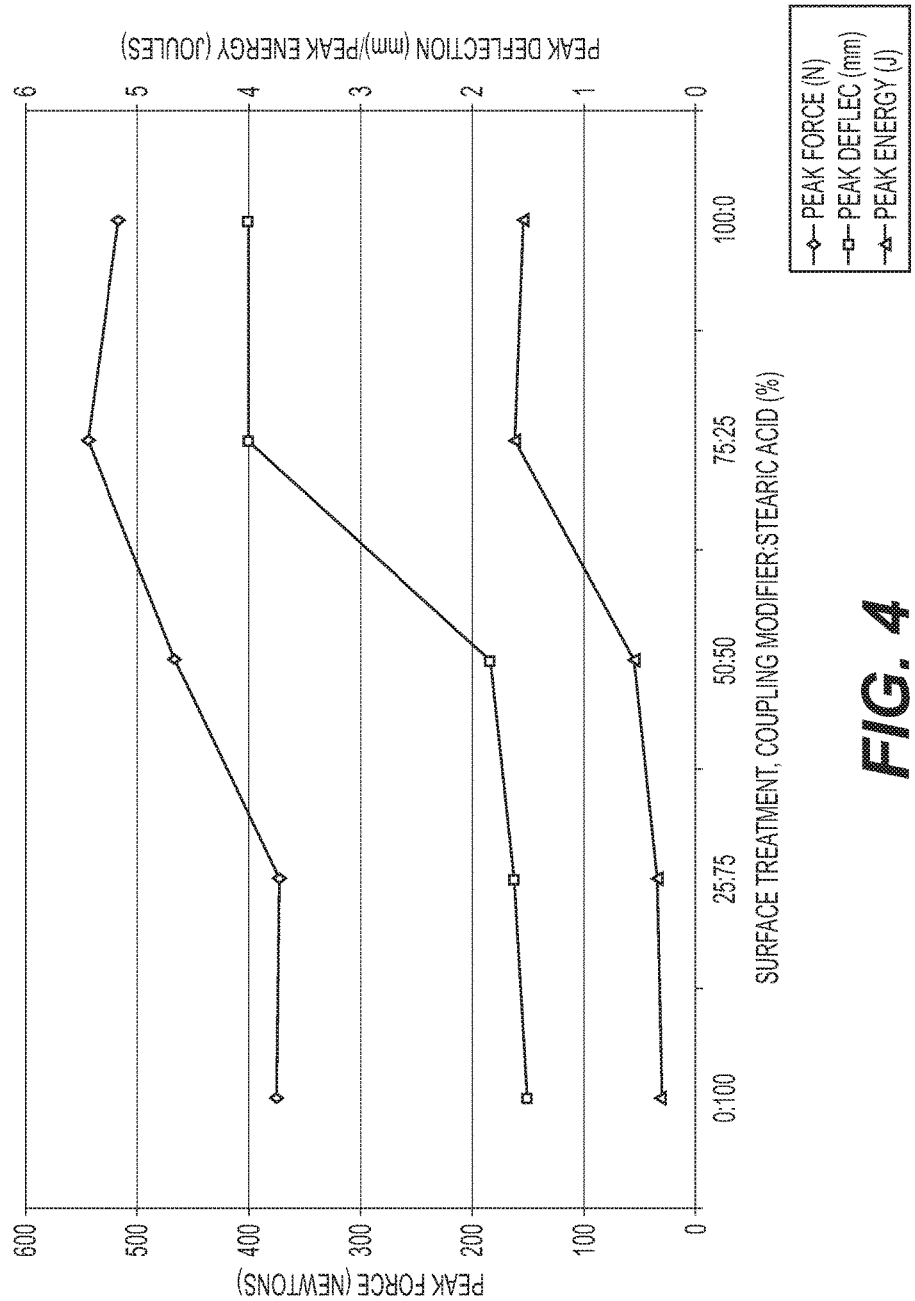
FIG. 4 is a graph summarizing various unnotched Charpy impact properties of compounded polymer materials comprising the coated wet ground carbonate of FIG. 1, as prepared in the Example 1.
Figure 5:
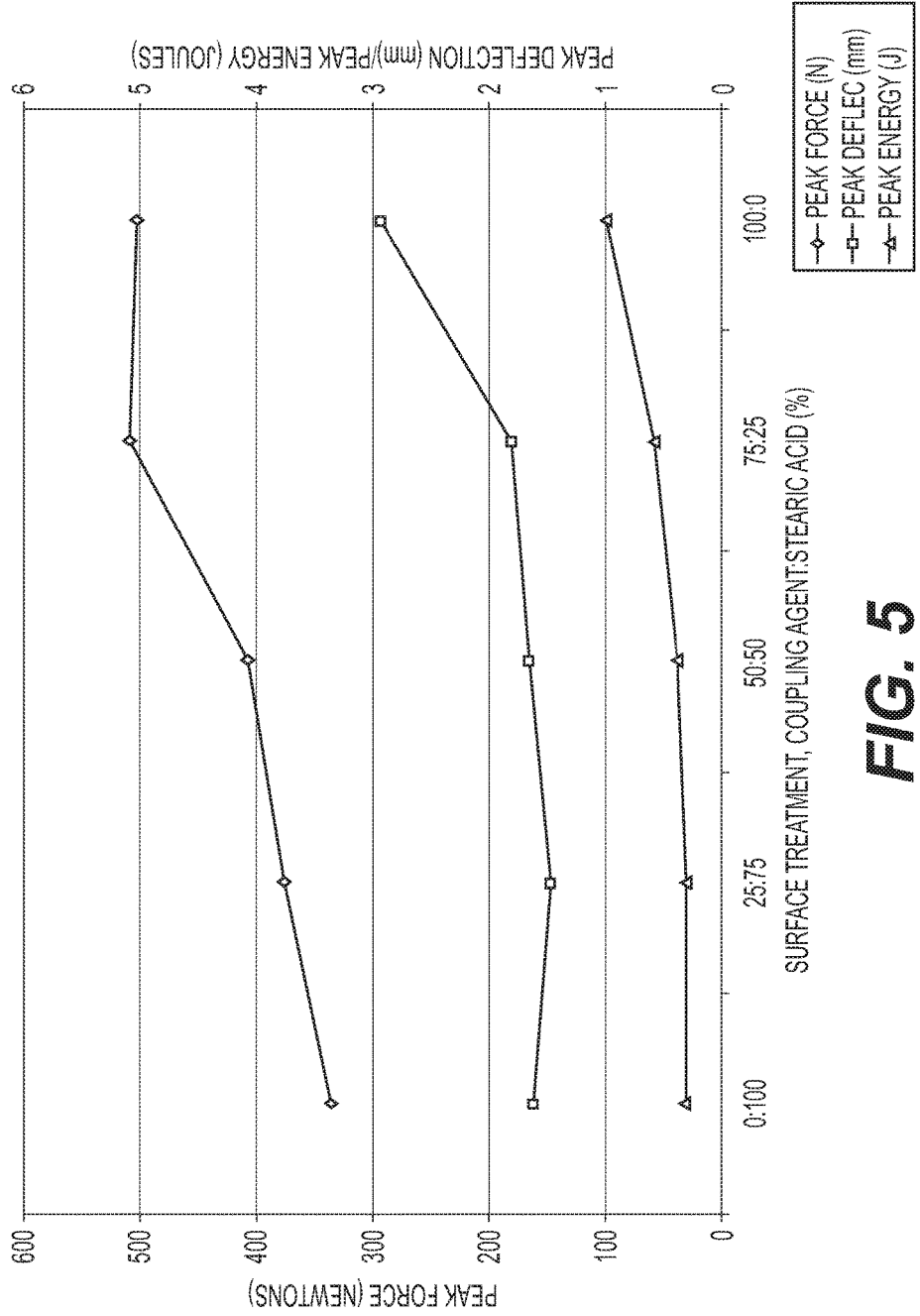
FIG. 5 is a graph summarizing various unnotched Charpy impact properties of compounded polymer materials comprising the coated dry ground carbonate of FIG. 1, as prepared in the Example 1.

As stated above, the present invention is directed to processes for recycling polymer waste, such as post-consumer waste polymer.

Recycling refers to processing materials for use in its original end use purpose or for other purpose.

In accordance with the first aspect of the invention, there is a provided a process for recycling post-consumer polymer waste material comprising:
  providing at least one post-consumer waste polymer;
  cleaning the post-consumer waste polymer;
  providing a functional filler comprising
    i. an inorganic particulate; and
    ii. a coating comprising a first compound including a terminating propanoic group or ethylenic group with one or two adjacent carbonyl groups; and
  combining the post-consumer waste polymer and the functional filler to form a recycled polymer.

The post-consumer waste polymer is typically shredded, flaked, chipped or granulated prior to the cleaning step. Processes and apparatus for shredding, flaking, chipping or granulating polymer waste are well known in the art, as will be readily apparent to one of ordinary skill in the art.

The cleaning step may comprise washing, with or without float-separation techniques, the polymer waste to remove engrained dirt and other volatile and solid impurities. Typically, the polymer waste is washed in a washing tank in the presence of water and other cleaning additives, such as surfactants, detergents and the like. The polymer waste material may be mechanically agitated to facilitate the removal of impurities. Additionally, the polymer waste may be subjected to abrasion during the washing step, for example, with a brush and the like. An advantage of wet cleaning is that it may combine density separation and cleaning of mixed polymer waste streams comprising polyethylene (PE), polypropylene(PP) and other polymer fractions to produce a separated fraction with a density less than about 1 $g/cm^3$, which would mainly (e.g., greater than 90% by weight) contain PE and PP.

In an embodiment, the cleaning comprises dry cleaning the waste polymer to remove volatile and solid impurities from the waste polymer. Suitable dry cleaning plant includes a chamber, which may be cylindrical, in which the polymer waste material is rotated in the presence of a gas and kept in suspension. In an embodiment, the dry cleaning includes centrifuging the polymer waste material. The gas is preferably heated above ambient temperature. The temperature may be in the range of 50° C. to 200° C., for example, between 50° C. and 150° C. In an embodiment, the gas is hot air. A person of ordinary skill in the art will be able to determine suitable above ambient temperatures. The turbulence ensures an excellent drying effect (e.g., a constant average moisture content of about 2%). Impurities such as sand, soil, paper and fibres may be separated off by screens and the cleaned material is passed to a material discharge point for further processing. The impurities may be separated by one or more melt filters incorporated within the screens. Therefore, in an embodiment, the process further comprises melt filtering the waste polymer, optionally in a vacuum. This dry cleaning process is carried out in the absence of added solvent(s) and can therefore be described as solvent-free dry cleaning. This dry cleaning process is carried out in the absence of added water or other aqueous liquids.

Through the removal of the volatile or solid impurities, unpleasant odours associated with such impurities are reduced or eradicated owing, at least in part, to the novel cleaning steps of the processes of the present invention. Solvent-free dry cleaning is particularly advantageous as it enables to the production of thoroughly cleaned polymer waste at relatively low cost compared to, for example, a conventional (wet) washing step using detergents and the like. Further, because cleaning agents such as detergents and solvents and the like are not used in the dry cleaning, steps to remove these cleaning agents prior to further processing are not necessary. Moreover, because the dry cleaned polymer waste is in a dry state, measures to dry the cleaned polymer waste prior to further processing are not necessary.

The (solvent-free) dry cleaning of the polymer waste enables a clean, dry and relatively gentle (compared to conventional wet cleaning processes) process which, with a relatively short dwell time, enables the production of recycled polymer wastes without adversely impacting on the quality of the polymer waste.

In another advantageous embodiment, the polymer waste is cleaned in a series of two or more (solvent-free) dry cleaning steps, as described above. In such an embodiment, the cleaned material discharged from the first dry cleaning step is subjected to a second dry cleaning step. This process may further comprise melt filtering the waste polymer, optionally in a vacuum. This process may further comprise a first compounding stage in which the dry cleaned polymer waste is combined with the functional filler and an optional peroxide-containing additive, which is followed by a second compounding stage in which additional components, for example, slip and/or process aids and/or mould release agents and/or antioxidants, as described below, are combined with the composition of the first compounding stage.

In another embodiment, the cleaning step of the first aspect of the invention may comprise solvent-based dry cleaning. Solvent-based dry cleaning techniques are well known in the art, as will be readily apparent to one of ordinary skill in the art. Typical solvents include glycol ethers, hydrocarbon-based solvents, liquid silicone, perchloroethylene and supercritical $CO_2$. Supercritical carbon dioxide may used as a more environmentally friendly solvent as compared to the more traditional solvents such as hydrocarbons and perchloroethylene. The solvent may include a small amount of detergent (e.g., 0.5 to 1.5%) to enhance cleaning power. The detergent may be anionic or cationic. In another embodiment, the clearing process of the first aspect of the invention does not include solvent-based dry cleaning.

In a further embodiment, the waste polymer, e.g., a post-consumer waste polymer, is pre-washed prior to dry cleaning the waste polymer.

In accordance with the second aspect of the invention, there is provided a process for recycling polymer waste material comprising:
  providing at least one waste polymer;
  cleaning the waste polymer in a first process step;
  cleaning the waste polymer in a second process step;
  providing a functional filler including
    i. an inorganic particulate; and
    ii. a coating comprising a compound including a terminating propanoic group or ethylenic group with one or two adjacent carbonyl groups; and
  combining the waste polymer and the functional filler to form a recycled polymer.

The first and second cleaning steps are described above in connection with the first aspect of the invention. One or both of the cleaning steps may include solvent-free dry cleaning as described above in connection with the first aspect of the invention. The adaption of conventional cleaning protocols by using at least two cleaning steps is advantageous as it enables the production of relatively cleaner polymer waste streams which are substantially devoid of volatile and solid impurities which may otherwise cause unpleasant odours and/or adversely affect the quality of the final recycled polymer composition.

The first and/or second cleaning process steps may comprise solvent-based dry cleaning, as described above. Typical solvents include glycol ethers, hydrocarbon-based solvents, liquid silicone, perchloroethylene and supercritical $CO_2$. Supercritical carbon dioxide may used as a more environmentally friendly solvent as compared to the more traditional solvents such as hydrocarbons and perchloroethylene. The solvent may include a small amount of detergent (e.g., 0.5 to 1.5%) to enhance cleaning power. The detergent may be anionic or cationic.

Thus, in embodiments the first and second process steps of the second aspect of the present invention may comprise either (i) washing, with or without float-separation techniques, the polymer waste to remove engrained dirt and other volatile and solid impurities, as described above, (ii) solvent-free dry cleaning, as described above or (iii) solvent-based dry cleaning, as described above.

In accordance with the third aspect of the invention, there is provided a process for recycling polymer waste material comprising:
  providing at least one waste polymer;
  dry cleaning the waste polymer;
  providing a functional filler including
    i. an inorganic particulate; and
    ii. a coating comprising a compound including a terminating propanoic group or ethylenic group with one or two adjacent carbonyl groups; and
  combining the waste polymer and the functional filler to form a recycled polymer.

The dry cleaning of the waste polymer in accordance with this aspect of the invention is described above in connection with the first and second aspects of the invention. Thus, in one embodiment, dry cleaning the waste polymer comprises solvent-free dry cleaning the waste polymer. In another embodiment, the dry cleaning comprises solvent-based dry cleaning the waste polymer. In a further embodiment, dry cleaning the waste polymer comprises solvent-free and solvent-based dry cleaning the waste polymer in a series of two or more dry cleaning steps. In yet another embodiment, dry cleaning the polymer waste does not include solvent-based dry cleaning.

In one advantageous embodiment of the first, second and third aspects of the invention, the waste polymer comprises at least two different polymer types, for example, at least three different polymer types. For example, the waste polymer stream may comprise polyethylene (e.g., HDPE) and polypropylene or, for example, the waste polymer stream may comprise high density polyethylene (HDPE) and low density polyethylene (LDPE) or, for example, the waste polymer stream may comprise HDPE, LDPE and polypropylene (as commonly found of recycled municipal waste streams). The process of the present invention therefore enables the effective and economical recycling of polymer waste streams without the need to necessarily separate the polymer waste streams into different polymer types prior to further processing.

In another embodiment, the at least one waste polymer of the second and third aspects of the present invention may be post-consumer waste polymer.

An exemplary apparatus for dry cleaning polymer waste in accordance with the present invention is provided by Maschinen und Anlagenbau Schulz GmbH (see: http://pdf-.directindustry.com/pdf/m-a-s-maschinen-und-anlagenbau-schulz/drying-and-cleaning-plant/64259-147163.html, the entire contents of which are hereby incorporated by reference).

Following cleaning, the cleaned polymer waste is combined with a functional filler to form a recycled polymer. In an embodiment, the functional filler is present in an amount equal to or greater than about 3% by weight of the waste polymer, for example, equal to or greater than about 5% by weight, for example, equal to or greater than about 8% by weight of the waste polymer. In an embodiment, the functional filler is present in an amount equal to or greater than about 10% by weight of the waste polymer, for example, equal to or greater than about 20% by weight, for example, equal to or greater than about 30% by weight, for example, equal to or greater than about 40% by weight, for example, equal to or greater than about 50% by weight or, for example, equal to or greater than about 60% by weight. In another embodiment, the functional filler is present in an amount ranging from about 5% to about 70% by weight of the waste polymer, for example, from about 10% to about 70% by weight of the waste polymer, for example, from about 5% to about 60%, for example, from about 5% to about 50%, for example, from about 5% to about 40%, for example, from about 5% to about 35% by weight, for example, from about 5% to about 30% by weight, for example, from about 5% to about 30% by weight, for example, from about 5% to about 25% by weight, for example, from about 5% to about 20% by weight, for example, from about 5% to about 15% by weight, for example, from about 20% to about 70% by weight, for example, from about 30% to about 70% by weight, for example, from about 40% to about 70% by weight or, for example, from about 50% to about 20% by weight of the waste polymer. The functional filler may be present in amount less than or equal to about 80% by weight of the waste polymer, for example, less than or equal to about 70%, for example, less than or equal to about 60%, for example less than or equal to about 50% or, for example, less than about 40% by weight of the waste polymer. The functional filler is described in detail below. As further described below, in embodiments, the coating of the functional filler may additionally comprise a second compound selected from the group consisting of fatty acids and salts of fatty acids, for example, stearic acid and/or calcium stearate.

In an embodiment, the process further comprises combining the waste polymer and the functional filler with a peroxide-containing additive. The peroxide-containing additive is described in detail below.

The combining may comprise compounding in an extruder or in a masterbatch. This step may be integrated with the cleaning and/or dry cleaning steps. Alternatively, the cleaned polymer waste material may be transported to a separate location and then combined with the functional filler and the optional peroxide-containing additive, and further processed in accordance with the first, second and third aspects of the invention. Further details of this aspect of the processes of the present invention are described in detail below under the section entitled 'polymer compositions'.

In an embodiment of the process aspects of the present invention, the process further comprises combining the cleaned waste polymer and the functional filler with virgin polymer material (i.e., non-recycled polymer material) prior to forming the recycled polymer composition.

The Functional Filler

In accordance with at least the fourth and seventh aspects of the present invention, the functional filler comprises an inorganic particulate and a coating comprising a first compound including a terminating propanoic group or ethylenic group with one or two adjacent carbonyl groups. The purpose of the coating is to improve the compatibility of the inorganic particulate filler and the polymer matrix with which it is to be combined, and/or improve the compatibility of two or more different polymers in the recycled polymer composition by cross-linking or grafting the different polymers. In recycled polymer compositions comprising recycled and virgin polymer, the functional filler coating may serve to cross-link or graft the different polymers.

In other aspects and embodiments of the present invention, the coating additionally comprises a second compound selected from the group consisting of one or more fatty acids and one or more salts of fatty acids, for example, stearic acid or calcium stearate.

The Inorganic Particulate Material

The inorganic particulate material may, for example, be an alkaline earth metal carbonate or sulphate, such as calcium carbonate, magnesium carbonate, dolomite, gypsum, a hydrous kandite clay such as kaolin, halloysite or ball clay, an anhydrous (calcined) kandite clay such as metakaolin or fully calcined kaolin, talc, mica, perlite or diatomaceous earth, or magnesium hydroxide, or aluminium trihydrate, or combinations thereof.

A preferred inorganic particulate material for use in the method according to the first aspect of the present invention is calcium carbonate. Hereafter, the invention may tend to be discussed in terms of calcium carbonate, and in relation to aspects where the calcium carbonate is processed and/or treated. The invention should not be construed as being limited to such embodiments.

The particulate calcium carbonate used in the present invention may be obtained from a natural source by grinding. Ground calcium carbonate (GCC) is typically obtained by crushing and then grinding a mineral source such as chalk, marble or limestone, which may be followed by a particle size classification step, in order to obtain a product having the desired degree of fineness. Other techniques such as bleaching, flotation and magnetic separation may also be used to obtain a product having the desired degree of fineness and/or colour. The particulate solid material may be ground autogenously, i.e. by attrition between the particles of the solid material themselves, or, alternatively, in the presence of a particulate grinding medium comprising particles of a different material from the calcium carbonate to be ground. These processes may be carried out with or without the presence of a dispersant and biocides, which may be added at any stage of the process.

Precipitated calcium carbonate (PCC) may be used as the source of particulate calcium carbonate in the present invention, and may be produced by any of the known methods available in the art. TAPPI Monograph Series No 30, "Paper Coating Pigments", pages 34-35 describes the three main commercial processes for preparing precipitated calcium carbonate which is suitable for use in preparing products for use in the paper industry, but may also be used in the practice of the present invention. In all three processes, a calcium carbonate feed material, such as limestone, is first calcined to produce quicklime, and the quicklime is then slaked in water to yield calcium hydroxide or milk of lime. In the first process, the milk of lime is directly carbonated with carbon dioxide gas. This process has the advantage that no by-product is formed, and it is relatively easy to control the properties and purity of the calcium carbonate product. In the second process the milk of lime is contacted with soda ash to produce, by double decomposition, a precipitate of calcium carbonate and a solution of sodium hydroxide. The sodium hydroxide may be substantially completely separated from the calcium carbonate if this process is used commercially. In the third main commercial process the milk of lime is first contacted with ammonium chloride to give a calcium chloride solution and ammonia gas. The calcium chloride solution is then contacted with soda ash to produce by double decomposition precipitated calcium carbonate and a solution of sodium chloride. The crystals can be produced in a variety of different shapes and sizes, depending on the specific reaction process that is used. The three main forms of PCC crystals are aragonite, rhombohedral and scalenohedral, all of which are suitable for use in the present invention, including mixtures thereof.

Wet grinding of calcium carbonate involves the formation of an aqueous suspension of the calcium carbonate which may then be ground, optionally in the presence of a suitable dispersing agent. Reference may be made to, for example, EP-A-614948 (the contents of which are incorporated by reference in their entirety) for more information regarding the wet grinding of calcium carbonate.

In some circumstances, additions of other minerals may be included, for example, one or more of kaolin, calcined kaolin, wollastonite, bauxite, talc, titanium dioxide or mica, could also be present.

When the inorganic particulate material of the present invention is obtained from naturally occurring sources, it may be that some mineral impurities will contaminate the ground material. For example, naturally occurring calcium carbonate can be present in association with other minerals. Thus, in some embodiments, the inorganic particulate material includes an amount of impurities. In general, however, the inorganic particulate material used in the invention will contain less than about 5% by weight, preferably less than about 1% by weight, of other mineral impurities.

Unless otherwise stated, particle size properties referred to herein for the inorganic particulate materials are as measured by the well known conventional method employed in the art of laser light scattering, using a CILAS 1064 Instrument (or by other methods which give essentially the same result). In the laser light scattering technique, the size of particles in powders, suspensions and emulsions may be measured using the diffraction of a laser beam, based on an application of Mie theory. Such a machine provides measurements and a plot of the cumulative percentage by volume of particles having a size, referred to in the art as the 'equivalent spherical diameter' (e.s.d), less than given e.s.d values. The mean particle size $d_{50}$ is the value determined in this way of the particle e.s.d at which there are 50% by volume of the particles which have an equivalent spherical diameter less than that $d_{50}$ value. The term $d_{90}$ is the particle size value less than which there are 90% by volume of the particles.

The $d_{50}$ of the inorganic particulate may be less than about 100 μm, for example, less than about 80 μm for example, less than about 60 μm for example, less than about 40 μm, for example, less than about 20 μm, for example, less than about 15 μm, for example, less than about 10 μm, for example, less than about 8 μm, for example, less than about 6 μm, for example, less than about 5 μm, for example, less than about 4, for example, less than about 3 μm, for example less than about 2 μm, for example, less than about 1.5 μm or, for example, less than about 1 μm. The $d_{50}$ of the inorganic particulate may be greater than about 0.5 μm, for example, greater than about 0.75 μm greater than about 1 μm, for example, greater than about 1.25 μm or, for example, greater than about 1.5 μm. The $d_{50}$ of the inorganic particulate may be in the range of from 0.5 to 20 μm, for example, from about 0.5 to 10 μm, for example, from about 1 to about 5 μm, for example, from about 1 to about 3 μm, for example, from about 1 to about 2 μm, for example, from about 0.5 to about 2 μm or, for example, from about 0.5 to 1.5 μm, for example, from about 0.5 to about 1.4 μm, for example, from about 0.5 to about 1.4 μm, for example, from about 0.5 to about 1.3 μm, for example, from about 0.5 to about 1.2 μm, for example, from about 0.5 to about 1.1 μm, for example, from about 0.5 to about 1.0 μm, for example, from about 0.6 to about 1.0 μm, for example, from about 0.7 to about 1.0 μm, for example about 0.6 to about 0.9 μm, for example, from about 0.7 to about 0.9 μm.

The $d_{90}$ (also referred to as the top cut) of the inorganic particulate may be less than about 150 μm, for example, less than about 125 μm for example, less than about 100 μm for example, less than about 75 μm, for example, less than about 50 μm, for example, less than about 25 μm, for example, less than about 20 μm, for example, less than about 15 μm, for example, less than about 10 μm, for example, less than about 8 μm, for example, less than about 6 μm, for example, less than about 4 μm, for example, less than about 3 μm or, for example, less than about 2 μm. Advantageously, the $d_{90}$ may be less than about 25 μm.

The amount of particles smaller than 0.1 μm is typically no more than about 5% by volume.

The inorganic particulate may have a particle steepness equal to or greater than about 10. Particle steepness (i.e., the steepness of the particle size distribution of the inorganic particulate) is determined by the following formula:

Steepness=100×($d_{30}/d_{70}$), wherein $d_{30}$ is the value of the particle e.s.d at which there are 30% by volume of the particles which have an e.s.d less than that $d_{30}$ value and $d_{70}$ is the value of the particle e.s.d. at which there are 70% by volume of the particles which have an e.s.d. less that that $d_{70}$ value.

The inorganic particulate may have a particle steepness equal to or less than about 100. The inorganic particulate may have a particle steepness equal to or less than about 75, or equal to or less than about 50, or equal to or less than about 40, or equal to or less than about 30. The inorganic particulate may have a particle steepness from about 10 to about 50, or from about 10 to about 40.

The inorganic particulate is coated with a coupling modifier.

The Coating

The coating comprises a compound including a terminating propanoic group or ethylenic group with one or two adjacent carbonyl groups (also referred to herein as a coupling modifier).

In one embodiment, the coupling modifier has a formula (1):

A-(X—Y—CO)$_m$(O—B—CO)$_n$OH  (1)

wherein
A is a moiety containing a terminating ethylenic bond with one or two adjacent carbonyl groups;

X is O and m is 1 to 4 or X is N and m is 1;

Y is $C_{1-18}$-alkylene or $C_{2-18}$-alkenylene;

B is $C_{2-6}$-alkylene; n is 0 to 5;

provided that when A contains two carbonyl groups adjacent to the ethylenic group, X is N.

In an embodiment, A-X— is the residue of acrylic acid, optionally wherein $(O-B-CO)_n$ is the residue of δ-valerolactone or ε-caprolactone or a mixture thereof, and optionally wherein n is zero.

In another embodiment, A-X— is the residue of maleimide, optionally wherein $(O-B-CO)_n$ is the residue of δ-valerolactone or ε-caprolactone or a mixture thereof, and optionally wherein n is zero.

Specific examples of coupling modifiers are β-carboxy ethylacrylate, β-carboxyhexylmaleimide, 10-carboxydecylmaleimide and 5-carboxy pentyl maleimide. Exemplary coupling modifiers and there methods of preparation are described in U.S. Pat. No. 7,732,514, the entire contents of which is hereby incorporated by reference.

In another embodiment, the coupling modifier is β-acryloyloxypropanoic acid or an oligomeric acrylic acid of the formula (2):

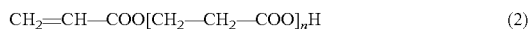

$$CH_2=CH-COO[CH_2-CH_2-COO]_nH \quad (2)$$

wherein n represents a number from 1 to 6.

In an embodiment, n is 1, or 2, or 3, or 4, or 5, or 6.

The oligomeric acrylic acid of formula (2) may be prepared by heating acrylic acid in the presence of 0.001 to 1% by weight of a polymerization inhibitor, optionally under elevated pressure and in the presence of an inert solvent, to a temperature in the range from about 50° C. to 200° C. Exemplary coupling modifiers and there methods of preparation are described in U.S. Pat. No. 4,267,365, the entire contents of which is hereby incorporated by reference.

In another embodiment, the coupling modifier is β-acryloyloxypropanoic acid. This species and its method of manufacture is described in U.S. Pat. No. 3,888,912, the entire contents of which is hereby incorporated by reference.

The coupling modifier is present in the functional filler in an amount effective to achieve the desired result. This will vary between coupling modifiers and may depend upon the precise composition of the inorganic particulate. For example, the coupling modifier may be present in an amount equal to or less than about 5 wt. % based on the total weight of the functional filler, for example equal to or less than about 2 wt. % or, for example equal to or less than about 1.5 wt. %. In an embodiment, the coupling modifier is present in the functional filler in an amount equal to or less than about 1.2 wt. % based on the total weight of the functional filler, for example equal to or less than about 1.1 wt. %, for example equal to or less than about 1.0 wt. %, for example, equal to or less than about 0.9 wt. %, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example less than about 0.1 wt. %. Typically, the coupling modifier is present in the functional filler in an amount greater than about 0.05 wt. %. In further embodiments, the coupling modifier is present in the functional filler in an amount ranging from about 0.1 to 2 wt. % or, for example, from about 0.2 to about 1.8 wt. %, or from about 0.3 to about 1.6 wt. %, or from about 0.4 to about 1.4 wt. %, or from about 0.5 to about 1.3 wt. %, or from about 0.6 to about 1.2 wt. %, or from about 0.7 to about 1.2 wt. %, or from about 0.8 to about 1.2 wt. %, or from about 0.8 to about 1.1 wt. %.

In further aspects (e.g., the fourth aspect) and embodiments of the present invention, the coating additionally comprises a second compound selected from the group consisting of one or more fatty acids and one or more salts of fatty acids, and combinations thereof.

In an embodiment, the one or more fatty acids is selected from the group consisting of lauric acid, myristic acid, palmitic acid, stearic acid, arachidic acid, behenic acid, lignoceric acid, cerotic acid, myristoleic acid, palmitoleic acid, saplenic acid, oleic add, elaidic acid, vaccenic acid, linoleic acid, linoelaidic acid, α-linolenic acid, arachidonic acid, eicosapentaenoic, erucic acid, docosahexaenoic acid and combinations thereof. In another embodiment, the one or more fatty acids is a saturated fatty acid or an unsaturated fatty acid. In another embodiment, the fatty acid is a $C_{12}$-$C_{24}$ fatty acid, for example, a $C_{16}$-$C_{22}$ fatty acid, which may be saturated or unsaturated. In one embodiment, the one or more fatty acids is stearic acid, optionally in combination with other fatty acids.

In another embodiment, the one or more salts of a fatty acid is a metal salt of the aforementioned fatty acids. The metal may be an alkali metal or an alkaline earth metal or zinc. In one embodiment, the second compound is calcium stearate.

The second compound, when present, is present in the functional filler in an amount effective to achieve the desired result. This will vary between coupling modifiers and may depend upon the precise composition of the inorganic particulate. For example, the second compound may be present in an amount equal to or less than about 5 wt. % based on the total weight of the functional filler, for example equal to or less than about 2 wt. % or, for example equal to or less than about 1 wt. %. In an embodiment, the, second compound is present in the functional filler in an amount equal to or less than about 0.9 wt. % based on the total weight of the functional filler, for example equal to or less than about 0.8 wt. %, for example equal to or less than about 0.7 wt. %, for example, less than or equal to about 0.6 wt. %, for example equal to or less than about 0.5 wt %, for example equal to or less than about 0.4 wt. %, for example equal to or less than about 0.3 wt. %, for example equal to or less than about 0.2 wt. % or, for example equal to or less than about 0.1 wt. %. Typically, the second compound, if present, is present in the functional filler in an amount greater than about 0.05 wt. %. The weight ratio of the coupling modifier to the second compound may be from about 5:1 to about 1:5, for example, from about 4:1 to about 1:4, for example, from about 3:1 to about 1:3, for example, from about 2:1 to about 1:2 or, for example, about 1:1. The amount of coating, comprising the first compound (i.e., the coupling modifier) and the second compound (i.e., the one more fatty acids or salts thereof), may be an amount which is calculated to provide a monolayer coverage on the surface of the inorganic particulate. In embodiments, the weight ratio of the first compound to the second compound is from about 4:1 to about 1:3, for example from about 4:1 to about 1:2, for example from about 4:1 to about 1:1, for example from about 4:1 to about 2:1, for example, from about 3.5:1 to about 1:1, for example from about 3.5:1 to 2:1 or, for example, from about 3.5:1 to about 2.5:1

The addition of the second compound means that the amount of the first compound, which is relatively expensive compared to the second compound, can be reduced, therefore enabling the production of polymer compositions at reduced cost without adversely affecting the compatibility enhancing effect of the coupling modifier and/or the mechanical properties of the filled polymer composition. The partial replacement of the first compound with the second compound, for example, stearic acid, may advantageously lead to an improvement in one or more mechanical properties of the filled polymer or, in other embodiments, enable the formulator to modify one or more mechanical properties of the filled polymer depending on, for example, the amount of the second compound included in the filler to partially replace the first compound. The one or more mechanical properties may be selected from the following tensile properties: Elongation at Yield (%), Elongation at Break (%), Yield Stress (MPa) and Stress at Break (MPa). The one or more mechanical properties may be selected from the following unnotched Charpy impact properties: Peak Force (N), Peak Deflection (mm) and Peak Energy (J). These properties may be measured in accordance with the methods described below.

The coating may additionally comprise a peroxide-containing additive. In an embodiment, the peroxide-containing additive comprises di-cumyl peroxide or 1,1-Di(tert-butylperoxy)-3,3,5-trimethylcyclohexane. The peroxide-containing additive may not necessarily be included with the coating and instead may be added during the compounding of the functional filler and the polymer, as described below. In some polymer systems, e.g., HDPE, the inclusion of a peroxide-containing additive may promote cross-linking of the polymer chains. In other polymer systems, e.g., polypropylene, the inclusion of a peroxide-containing additive may promote polymer chain scission. The peroxide-containing additive may be present in the functional filler in amount effective to achieve the desired result. This will vary between coupling modifiers and may depend upon the precise composition of the inorganic particulate and the polymer. For example, the peroxide-containing additive may be present in an amount equal to or less than about 1 wt. % based on the weight of the polymer in the polymer composition to which the peroxide-containing additive is to be added, for example, equal to or less than about 0.5 wt. %, for example, 0.1 wt %, for example equal to or less than about 0.09 wt. %, or for example equal to or less than about 0.08 wt. % or for example, equal to or less than about 0.06 wt. %. Typically, the peroxide-containing additive, if present, is present in an amount greater than about 0.01 wt. % based on the weight of the polymer.

The functional filler may be prepared by combining the inorganic particulate, coating compound(s) and optional peroxide-containing additive and mixing using conventional methods, for example, using a Steele and Cowlishaw high intensity mixer, preferably at a temperature equal to or less than 80° C. The coating compound(s) may be applied after grinding the inorganic particulate, but before the inorganic particulate is added to the optionally recycled polymer composition. For example, the coating compound(s) may be added to the inorganic particulate in a step in which the inorganic particulate is mechanically de-aggregated. Coating compounds may be applied during de-aggregation carried out in a milling machine, such as a laboratory scale mill, which may be carried out for a suitable time period, for example about 300 seconds.

According to another aspect, the present invention is directed to the use of a functional filler as defined in accordance with the first, second or third aspects of the present invention in a recycled polymer derived from at least one waste polymer, wherein the at least one waste polymer is cleaned in accordance with the first, second or third aspects of the present invention. In an embodiment, the at least one waste polymer is post-consumer polymer waste. For example, the post-consumer polymer waste may be a mixture of polyethylene (e.g., HDPE) and polypropylene (PP) or, for example, a mixture of HDPE and LDPE or, for example, a mixture of HDPE, LDPE and PP. In one embodiment, the post-consumer polymer waste may include polymer from multiple sources (i.e., supply streams) and from 90% to 100% polyethylene and polypropylene.

In an embodiment of this aspect of the invention, the at least one waste polymer may comprise a mixture of at least two different polymer types or at least three different polymer types selected from linear low density polyethylene (LLDPE) and medium density grades thereof, high density polyethylene (HDPE), low density polyethylene (LDPE), polypropylene (PP) and polystyrene.

In another embodiment, the recycled polymer is solvent-free dry cleaned in accordance with the first, second or third aspects of the present invention.

Optional Additional Filler Components

The functional filler according to the present invention may contain one or more secondary filler components, if desired. Such additional components, where present, are suitably selected from known filler components for polymer compositions. For example, the inorganic particulate used in the functional filler may be used in conjunction with one more other known secondary filler components, such as for example, titanium dioxide, carbon black and talc. Additional secondary fillers are advantageously used in specific applications, such as for example in the preparation of garbage bags. When a secondary filler component is used the inorganic particulate is preferably present in the functional filler in an amount of at least 80% of the total dry weight of the mixed inorganic particulate and secondary filler component.

The functional filler may additionally comprise an antioxidant. Suitable antioxidants include, but are not limited to, organic molecules consisting of hindered phenol and amine derivatives, organic molecules consisting of phosphates and lower molecular weight hindered phenols, and thioesters. Exemplary antioxidants include Irganox 1010 and Irganox 215, and blends of Irganox 1010 and Irganox 215.

Polymer Compositions

As stated above, the present invention is directed to a polymer composition comprising at least one polymer and a functional filler. The functional filler comprises an inorganic particulate and a coating comprising a compound including a terminating propanoic group or ethylenic group with one or two adjacent carbonyl groups, as described above. The functional filler may be included, for example, as a compatibility modifier. In embodiments in which the at least one polymer is not recycled from polymer waste in accordance with the first, second or third aspects of the invention, the coating additionally comprises a second compound selected from the group consisting of one or more fatty acids and one or more salts of a fatty acid, for example, stearic acid and/or calcium stearate, as described above. In other embodiments, regardless of the derivation of the at least one polymer, the functional filler additionally comprises a second compound selected from the group consisting of one or more fatty acids and one or more salts of a fatty acid, for example, stearic acid and/or calcium stearate.

As described above, the functional filler may be present in an amount equal to or greater than about 10% by weight of the polymer, for example, equal to or greater than about 20% by weight, for example, equal to or greater than about 30% by weight, for example, equal to or greater than about 40% by weight, for example, equal to or greater than about 50% by weight or, for example, equal to or greater than about 60% by weight. In another embodiment, the functional filler is present in an amount ranging from about 10% to about 70% by weight of the polymer, for example, from about 20% to about 70% by weight, for example, from about 30% to about 70% by weight, for example, from about 40% to about 70% by weight or, for example, from about 50% to about 20% by weight of the polymer. The functional filler may be present in amount less than or equal to about 80% by weight of the polymer, for example, less than or equal to about 70%, for example, less than or equal to about 60%, for example less than or equal to about 50% or, for example, less than about 40% by weight of the polymer.

The coupling modifier of the functional filler, preferably the compound of formula (1) above, may be present in the polymer compositions or recycled polymer compositions of the present invention in an amount of from about 0.01% by weight to about 4% by weight, based on the total weight of the polymer and functional filler, for example, from about 0.02% by weight to about 3.5% by weight, for example from about 0.05% by weight to about 1.4% by weight, for example, from about 0.1% by weight to about 0.7% by weight, for example from about 0.15% by weight to about 0.7% by weight, for example from about 0.3% by weight to about 0.7% by weight, for example from about 0.5% by weight to about 0.7% by weight, for example from about 0.02 by weight to about 0.5%, for example, from about 0.05% by weight to about 0.5% by weight, for example from about 0.1% by weight to about 0.5% by weight, for example from about 0.15% by weight to about 0.5% by weight, for example from about 0.2% by weight about 0.5% by weight or, for example from about 0.3% by weight to about 0.5% by weight.

The polymers which may be used in accordance with the invention are advantageously thermoplastic polymers. Thermoplastic polymers are those which soften under the action of heat and harden again to their original characteristics on cooling, that is, the heating-cooling cycle is fully reversible. By conventional definition, thermoplastics are straight and branched linear chain organic polymers with a molecular bond. Examples of polymers which may be used in accordance with the invention include, but are not limited to, linear low density polyethylene (LLDPE) and medium density grades thereof, high density polyethylene (HDPE), low density polyethylene (LDPE), polypropylene (PP), polyethylene terephthalate (PET), vinyl/polyvinyl chloride (PVC), polystyrene, and mixtures thereof. In one embodiment, the polymer is not PET or PVC.

As stated above, aspects of the present invention are directed to recycled polymer compositions. Thus, polymers used in accordance with the invention are waste polymers, including all of the different types of polymer stated above. The polymer waste may include a mixture of different types of polymer, for example, a mixture of polyethylene and polypropylene. Types of waste polymer include post-consumer waste polymer, post-industrial waste polymer and post-agricultural waste polymer. Advantageously, the waste polymer used in accordance with the present invention may be post-consumer waste polymer.

Post-consumer waste (or post-use) includes but is not limited to material generated by end-users of products that has fulfilled its intended purpose or can no longer be used such as material returned from within the distribution chain; post-industrial waste includes but is not limited to material generated by industrial or manufacturing uses; agricultural waste includes but is not limited to material used in growing plants (e.g., trees, flowers, herbs, bushes, grasses, vines, ferns, mosses, and green algae) and which may contain organic matter; and mixed polymer wastes (or co-mingled plastics) includes but is not limited to material consisting of different types of plastic or polymer.

Consumer products made from polyethylene terephthalate (PET) include soda and water bottles and waterproof packaging. Recycled PET may be used in textiles or to make bottles.

Consumer products made from HPDE include milk and detergent bottles, toys and plastic bags. Uses for recycled HDPE include plastic pipes, plastic lumber, flower pots and rubbish bins.

Consumer products made from LDPE and LLDPE include plastic (grocery) bags, shrink wrap and films. Uses for recycled LDPE and LLDPE are plastic rubbish bags, grocery sacks, plastic tubing, agricultural film and plastic lumber.

Consumer products made from polypropylene include refrigerated containers, bags, bottle tops, carpets and some food wraps.

Consumer products made from polystyrene include non-reusable utensils, meat packing and protective packaging.

The functional filler described above may be incorporated into a polymer composition, from which polymer articles may be made of. In an embodiment, the polymer is derived from polymer waste which has been recycled in accordance with one or more of the processes of the present invention. If a peroxide-containing additive is not included with the functional filler it may be added during the compounding process. In some embodiments, the peroxide-containing additive may be provided in the form of a masterbatch. In further embodiments, a peroxide-containing additive is not present.

Preparation of the polymer and recycled polymer compositions of the present invention can be accomplished by any suitable mixing method known in the art, as will be readily apparent to one of ordinary skill in the art.

Such methods include compounding and extrusion. Compounding may be carried out using a twin screw compounder, for example, a Baker Perkins 25 mm twin screw compounder. The polymer, functional filler and optional peroxide containing additive may be premixed and fed from a single hopper. The resulting melt may be cooled, for example, in a water bath, and then pelletized. Test pieces, e.g., Charpy bars or tensile dumbbells, may be injection moulded or cast or blown into film.

The compounded compositions may further comprise additional components, such as slip aids (for example Erucamide), process aids (for example Polybatch® AMF-705), mould release agents and antioxidants. Suitable mould release agents will be readily apparent to one of ordinary skill in the art, and include fatty acids, and zinc, calcium, magnesium and lithium salts of fatty acids and organic phosphate esters. Specific examples are stearic acid, zinc stearate, calcium stearate, magnesium stearate, lithium stearate, calcium oleate and zinc palmitate. Typically, slip and process aids, and mould release agents are added in an amount less than about 5 wt. % based on the weight of the masterbatch. Polymer articles, including those described above, may then be extruded, compression moulded or injected moulded using conventional techniques known in the art, as will be readily apparent to one of ordinary skill in the art. Thus, the present invention is also directed to articles formed from the polymer or recycled polymer compositions of the present invention.

In an advantageous embodiment, the polymer composition is a recycled polymer obtainable by one or other of the processes of the first, second and third aspects of the invention. Advantageously, the polymer composition is a recycled polymer obtainable by one or other of the process of the present invention which comprises a solvent-free dry cleaning step. In an embodiment, the recycled polymer composition is substantially devoid of volatile or solid impurities, owing, at least in part, to the novel cleaning steps of the processes of the present invention. Through the removal of the volatile or solid impurities, unpleasant odours associated with such impurities are reduced or eradicated.

Further, in accordance with the first, second, third and fifth aspects of the present and embodiments thereof in which the waste polymer comprises at least two different polymer types, for example, polyethylene (e.g., HDPE) and polypropylene or, for example, HDPE and LDPE or, for example, HDPE, LDPE and PP, the compatibility of the at least two different polymers may be improved as exhibited by benefit in one or more mechanical properties, even at filler loading levels of 50% by weight or greater. Further, without wishing to be bound by theory, it is believed that the cleaning of the polymer waste material in accordance with the present invention, particularly solvent-free dry cleaning of the polymer waste, possibly resulting from the relatively gentle dry cleaning process to remove impurities, contributes to the attainment of recycled polymer waste materials having improved compatibility and mechanical properties. Thus, the present invention enables processing of mixed polymer waste streams without the need to separate the mixed polymer waste, e.g., via conventional float-separation techniques, into different polymer types.

The recycled polymer, optionally comprising at least two types of different polymer, may have a notched charpy impact peak energy equal to or greater than the same polymer that is a virgin polymer. Notched Charpy impact properties may be measured using a Rosand Instrumented Falling Weight Impact Tester Type 5 using a method similar to ISO 179, specimen type 1, edgewise impact, 2 mm v notch and impact speed of 2.9 m/s, and a test temperature equal to 23° C.

Unnotched Charpy impact properties may be measured using a Rosand IFW type 5 impact test machine at −20° C. A Charpy impact jig (ISO 179) is fitted to the Rosand instrument, and interpretation of the force/displacement curve is carried out as detailed in ISO 6603.

The recycled polymer, optionally comprising at least two types of different polymer, may have a tensile strength equal to or greater than the same polymer that is a virgin polymer. Tensile strength may be measured according to ISO 527 using a Hounsfield HK10S tensometer.

The polymer composition or recycled polymer composition comprising the functional filler according to the fourth aspect of the present invention and embodiments thereof, optionally comprising at least two types of different polymer, may have one or more tensile properties or one or more unnotched Charpy impact properties, as described above, which is comparable to or improved compared to the same polymer composition or recycled polymer composition comprising a coated filler which does not comprise both of the first and second compounds of the functional filler of the fourth aspect of the present invention.

Thus, in a further embodiment, the present invention is directed to the use of the functional filler of the fourth aspect of the present invention for maintaining or improving one or more tensile properties of a polymer composition, for example a recycled polymer composition, optionally comprising at least two types of polymer composition, compared to the same polymer composition or recycled polymer composition which does not comprise both of the first and second compounds of the functional filler of the fourth aspect of the invention.

Thus, in a further embodiment, the present invention is directed to the use of the functional filler of the fourth aspect of the present invention for maintaining or improving one or more unnotched Charpy impact properties of a polymer composition, for example a recycled polymer composition, optionally comprising at least two types of polymer composition, compared to the same polymer composition or recycled polymer composition which does not comprise both of the first and second compounds of the functional filler of the fourth aspect of the invention.

In the embodiments described immediately above directed to the use of the functional filler of the fourth aspect of the present invention, the weight ratio of the first compound (i.e., the coupling modifier) to the second compound (i.e., the one more fatty acids or salts thereof) may be from about 4:1 to about 1:1, for example, from about 4:1 to about 2:1, or any other weight ratio, or range of weight ratios, described above. In a further embodiment, the coupling modifier is a coupling modifier of formula (1) and the one or more fatty acids or salts thereof is stearic acid.

In the embodiment described immediately above directed to the use of the functional filler of the fourth aspect of the present invention, the polymer composition is a recycled polymer composition, optionally comprising at least two types of different polymers, which has been solvent-free dry cleaned, in accordance with the first, second or third aspects of the present invention.

The recycled polymer, optionally comprising at least two types of different polymer, may have a flexural modulus equal to or greater than the same polymer that is a virgin polymer. Flexural modulus may be measured according to ISO 178 using a Tinius Olsen universal test machine with a cross-head speed of 2 mm/min, and a span of 64 mm.

The articles which may be formed from the polymer compositions and recycled polymer compositions are many and various. In one embodiment, the recycled polymer composition is suitable for industrial uses such as film uses and piping uses.

Thus, in accordance with the eighth and ninth aspects of the present invention, there is provided articles of manufacture formed from the polymer composition of the fifth aspect of the present invention and embodiments thereof.

In accordance with the ninth aspect of the present invention, there is provided articles of manufacture formed from a polymer composition comprising at least one polymer (as described herein), a functional filler according to the fourth aspect of the present invention (as described herein) or a functional filler according to the seventh aspect of the present invention (as described herein).

The polymer composition from which the article is formed may further comprise a peroxide-containing additive (as described herein), for example, di-cumyl peroxide or 1,1-Di(tert-butylperoxy)-3,3,5-trimethylcyclohexane. The peroxide-containing additive is present in the coating of the functional filler.

Advantageously, the functional filler is that according to the seventh aspect of the present invention.

In a further embodiment, the functional filler of the fourth or seventh aspect of the present invention, particular the functional filler of the seventh aspect of the present invention, is present in the polymer composition in an amount of from about 5% to about 50% by weight of the polymer composition, for example, from about 5% to about 30% by weight of the polymer composition, or from about 5% to about 25%, or from about 5% to about 20% by weight, or from about 5% to about 15% by weight.

Articles of manufacture include injected moulded or extruded components such as, for example, industrial, commercial and residential piping and tubing, including underground water and sewage pipes, surface ground water piping, cable protection piping, piping for plumbing, and guttering for buildings, for example, commercial or residential buildings.

In this respect, it has surprisingly been found that in certain embodiments, the use of the functional filler of the seventh aspect of the present invention, in a polymer composition (optionally wherein the polymer composition comprises a mixture of at least two different polymer types) improves notched Charpy impact property of a moulded component formed from the polymer composition. In advantageous embodiments, the functional filler is present in the polymer composition in an amount ranging from about 5% to about 50%, for example, from about 5% to about 30% by weight of the polymer composition. The polymer composition may comprise a mixture of least two different polymer types, for example, polyethylene (e.g., HDPE) and polypropylene or, for example, HDPE and LDPE or, for example, HDPE, LDPE and PP.

Further, it has been unexpectedly found that functional filler compositions according to embodiments of the present invention, for example, those comprising inorganic particulate having a $d_{50}$ of greater than or equal to about 1.3 µm, incorporated into polymer compositions which are formed into moulded components, may prevent, reduce or ameliorate naturally occurring post-moulding shrinkage of the moulded component, for example, piping or tubing. This may cause difficulties when filled piping is used together with unfilled piping components, such as connecting collars. Thus, in certain embodiments of the seventh aspect of the present invention in which the inorganic particulate has a do of less than about 1.3 µm, for example, equal to or less than about 1.0 µm, the functional filler may be used in a polymer composition formed into a moulded component in an amount to control naturally occurring post-moulding shrinkage of the moulded component, for example, to obviate retardation of naturally occurring post-moulding shrinkage. Conversely, function filler according to certain embodiments of the present invention comprising inorganic particulate having a $d_{50}$ of greater than or equal to about 1.3 µm, for example, greater than or equal to about 1.2 µm, or about 1.1 µm, or about 1.0 µm, may be used in a in a polymer composition formed into a moulded component to ameliorate, reduce or prevent naturally occurring post-moulding shrinkage of the moulded component.

In certain embodiments, the moulded component is injection moulded in such embodiments, the polymer composition may be a recycled polymer composition derived from at least one waste polymer. The at least one polymer may be cleaned, for example, solvent-free dry cleaned, in accordance with any one of the first, second or third aspects of the present invention. The at least one waste polymer may comprise a mixture of at least two different polymer types.

For the avoidance of doubt, the present application is directed to the subject-matter described in the following numbered paragraphs:

1. A process for recycling post-consumer polymer waste material comprising:
   providing at least one post-consumer waste polymer;
   cleaning the post-consumer waste polymer;
   providing a functional filler comprising:
   I. an inorganic particulate; and
   ii. a coating comprising a first compound including a terminating propanoic group or ethylenic group with one or two adjacent carbonyl groups; and
   combining the post-consumer waste polymer and the functional filler to form a recycled polymer.

2. A process for recycling polymer waste material comprising:
   providing at least one waste polymer;
   cleaning the waste polymer in a first process step;
   cleaning the waste polymer in a second process step;
   providing a functional filler including
   i. an inorganic particulate; and
   ii. a coating comprising a first compound including a terminating propanoic group or ethylenic group with one or two adjacent carbonyl groups; and
   combining the waste polymer and the functional filler to form a recycled polymer.

3. The process of paragraph 1 or 2, wherein the cleaning comprises dry cleaning including centrifuging the waste polymer in a gas to remove volatile and/or solid impurities from the waste polymer.

4. A process for recycling polymer waste material comprising:
   providing at least one waste polymer;
   dry cleaning the waste polymer;
   providing a functional filler including:
   i. an inorganic particulate; and
   ii. a coating comprising a first compound including a terminating propanoic group or ethylenic group with one or two adjacent carbonyl groups; and
   combining the waste polymer and the functional filler to form a recycled polymer.

5. The process of paragraph 4, wherein the dry cleaning includes centrifuging the waste polymer in a gas to remove volatile and solid impurities from the waste polymer.

6. The process of any one of paragraphs 1-5, further comprising melt filtering the waste polymer.

7. The process of any one of paragraphs 3-6, further comprising washing the waste polymer prior to dry cleaning the waste polymer.

8. The process of any one of paragraphs 1-7, wherein the waste polymer comprises at least two different polymers, for example, polyethylene and polypropylene.

9. The process of paragraph 1, wherein the functional filler is present in an amount ranging from about 50% to about 70% by weight of the waste polymer.

10. The process of paragraphs 1, 2 or 4, wherein the step of combing comprises compounding in an extruder or in a masterbatch.

11. The process of paragraphs 1, 2 or 4, further comprising combining the waste polymer and the functional filler with a peroxide-containing additive to form a recycled polymer.

12. A process according to any preceding numbered paragraph, further comprising combining the waste polymer and the functional filler with virgin polymer prior to forming the recycled polymer.

13. A process according to any preceding numbered paragraph, wherein the coating additionally comprises a second compound selected from one or more fatty acids and one more salts of a fatty acid, for example, stearic acid and/or calcium stearate.

14. A functional filler comprising:
   i. an inorganic particulate; and
   ii. a coating on the surface of the inorganic particulate, wherein the coating comprises:
   a first compound including a terminating propanoic group or ethylenic group with one or two adjacent carbonyl groups; and a second compound selected from the group consisting of one or more fatty acids and one or more salts of a fatty acid, for example, stearic acid and/or calcium stearate.

15. The functional filler of paragraph 14, wherein the first compound has a formula (1):

wherein
A is a moiety containing a terminating ethylenic bond with one or two adjacent carbonyl groups;
X is O and m is 1 to 4 or X is N and m is 1;
Y is $C_{1-18}$-alkylene or $C_{2-18}$-alkenylene;
B is $C_{2-6}$-alkylene; n is 0 to 5;
provided that when A contains two carbonyl groups adjacent to the ethylenic group, X is N.

15. The functional filler of paragraph 14, wherein the first compound comprises β-acryloyloxypropanoic acid or an oligomeric acrylic acid of the formula (2):

wherein n represents a number from 1 to 6.

16. The functional filler of any one of paragraphs 14-16, wherein the coating further comprises a peroxide-containing additive, for example, di-cumyl peroxide or 1,1-Di(tert-butylperoxy)-3,3,5-trimethylcyclohexane.

17. The functional filler of paragraph 14, wherein the first and/or second compound is present in an amount less than 0.6 wt. % of the inorganic particulate.

18. A polymer composition, comprising:
  at least one polymer; and
  a functional filler including
    i. an inorganic particulate; and
    ii. a coating on the surface of the inorganic particulate, wherein the coating comprises:
      a first compound including a terminating propanoic group or ethylenic group with one or two adjacent carbonyl groups,
    with the proviso that when the at least one polymer is not recycled from polymer waste in accordance with any one of paragraphs 1-13, the coating additionally comprises a second compound selected from the group consisting of one or more fatty acids and one more salts of a fatty acid, for example, stearic acid and/or calcium stearate.

19. The composition of paragraph 19, wherein the coating comprises a second compound selected from the group consisting of one or more fatty acids and one more salts of a fatty acid, for example, stearic acid and/or calcium stearate.

20. A recycled polymer composition, obtainable by the process of any one of paragraphs 1-13.

21. The composition of any one of paragraphs 19-21, wherein the composition is a masterbatch.

22. The composition of paragraph 22, wherein the composition further comprises a peroxide-containing additive, for example, di-cumyl peroxide or 1,1-Di(tert-butylperoxy)-3,3,5-trimethylcyclohexane, optionally wherein the peroxide-containing additive is present in the coating.

23. The composition of paragraph 19, comprising at least one waste polymer, optionally wherein the at least one polymer comprises a mixture of at least two different polymer types or at least three polymer types.

24. The composition according to any one of paragraphs 19-25, wherein the functional filler is present in an amount ranging from about 50% to about 70% by weight of the polymer or recycled polymer composition.

25. The composition of any one of paragraphs 19-25, wherein the composition is suitable for industrial uses such as film uses and piping uses.

26. The composition of any one of paragraphs 19-25, wherein the composition is a recycled polymer composition and has a notched charpy peak energy equal to or greater than the same polymer that is a virgin polymer.

27. The use of a functional filler as defined in any one of paragraphs 1, 2 or 4 in a recycled polymer composition derived from at least one waste polymer, wherein the at least one polymer is cleaned, for example, (solvent-free) dry cleaned, in accordance with any one of paragraphs 1-7, optionally wherein the at least one waste polymer comprises a mixture of at least two different polymer types or at least three different polymer types.

The invention will now be illustrated, by reference to the following non-limiting examples.

EXAMPLES

Example 1

A dry ground calcium carbonate (designated RLO 8154) with a $d_{50}$ of 2.2 μm and having the particle size distribution depicted in FIG. 1 was coated with a coupling modifier according to formula (1) above and stearic acid.

A wet ground calcium carbonate (designated RLO 8155) with a $d_{50}$ of 1.6 μm and having the particle size distribution depicted in FIG. 1 was coated a coupling modifier according to formula (1) above and stearic acid.

The amount of surface treatment applied was calculated to give monolayer coverage on the surface.

RLO 8154 was coated with 0.47 Wt. % stearic acid or 0.4 Wt. % coupling modifier; RLO 8155 was coated with 0.9 Wt. % stearic acid or 0.6 Wt. % coupling modifier.

Intermediate coatings of (weight ratio) 25:75, 50:50 and 75:25 stearic acid:coupling modifier were also prepared.

The minerals were dried overnight in an oven at 80° C., and then coated using a Steele and Cowlishaw high intensity mixer heated to 80° C. Stearic acid was added to the mineral and the mixer run at 3000 r.p.m. for five minutes. The coupling modifier was then added to the mixer and run for a further 5 minutes.

The surface treated minerals were dried overnight before compounding into a municipal floatation product (principally composed of LDPE and LLDPE and containing a small amount of PP). After the coating process and immediately before compounding a peroxide (di-cumyl peroxide), at 0.06% on the filler, was tumble mixed into the filler.

Compounds, 50 wt % treated with the coated calcium carbonates were prepared using a Baker Perkins 25 mm twin screw compounder (see Table 1 below):

TABLE 1

| | Temperature (° C.) | | | | | | Speed (R.P.M.) |
|---|---|---|---|---|---|---|---|
| Die | 190 | 185 | 180 | 175 | 170 | 160 | 300 |

Charpy bars and tensile dumb-bells were injection moulded using an Arburg Allrounder injection moulder (see Table 2 below):

TABLE 2

| Temperature Profile (° C.) | 200, 200, 190, 180, 170 |
|---|---|
| Mould Temperature (° C.) | 40 |

After conditioning the moulded test pieces for a minimum of 5 days at 23° C., the samples were tested for tensile and Charpy impact properties.

Tensile properties were measured using a Hounsfield HK10S tensometer following ISO 527.

Impact properties were measured using a Rosand IFW type 5 impact test machine at −20° C. A Charpy impact jig (ISO 179) was fitted to the Rosand instrument, and interpretation of the force/displacement curve was carried out as detailed in ISO 6603.

Mechanical properties of the filled municipal products are summarized in FIGS. 2-5. In the graphs depicted in each of FIGS. 2-5, the x-axis shows the specific surface treatment. Thus 100% means a monolayer coverage and 75:25 means 75% of the monolayer dose for one chemical and 25% of the monolayer dose for the second chemical.

Example 2

Samples of uncoated filler ((i) a wet ground calcium carbonate with a $d_{50}$ of 0.8 μm and having a surface area of about 9 m$^2$/g), and (ii) a wet ground calcium carbonate with a $d_{50}$ of 1.3 μm and having a surface area of about 5 m$^2$/g) were dried overnight at 50° C. Coating (with a coupling modifier according to formula (1) above) was carried out using a Steele and Cowlishaw mixer heated to 40° C. for 10 minutes. For each material 1.5 kg of mineral was placed in the mixer, and a quantity (see Table 5) of coupling modifier was injected into the mixer after the motor was started. After coating, the fillers were placed in an oven at 30° C. until needed.

Compounds were prepared using a blend of 75% HDPE: 25% PP. Filler loadings of 10, 30 and 50 wt % were used. Dicumyl peroxide was added at 0.06 wt % on the polymer, and a sterically hindered phenolic antioxidant added at 0.1 wt %.

Compounds were prepared using a Coperion ZSK 18 twin-screw compounder, dried under vacuum at 50° C. overnight, and then injection moulded using an Arburg 320M injection moulder. Operating conditions are shown in Table 3.

TABLE 3

| Coperion ZSK 18 Operating Conditions | | | | | | | |
|---|---|---|---|---|---|---|---|
| | Temperature (° C.) | | | | | | |
| Feed | 170 | 180 | 185 | 185 | 190 | 195 | 210 |
| Speed | 350 | | | | | | |
| Output | 3.5 kgs/hr | | | | | | |

| Arburg 320M Injection Moulder | | | | | |
|---|---|---|---|---|---|
| | Temperature (° C.) | | | | |
| Feed | 195 | 205 | 215 | 225 | 225 |
| Mould Temp. | 65 | | | | |

After conditioning for a minimum of five days at 23° C./55% relative humidity, samples were tested for flexural properties, unnotched Charpy impact properties at −20° C., and notched Charpy impact properties. Test methods are shown in Table 4.

TABLE 4

| Test | Test Standard | Test Equipment | Test Temperature |
|---|---|---|---|
| Flexural Modulus | ISO 178/ASTM D790 | Tinius Olsen HK10 tensometer | 23° C. |
| Unnotched Charpy Impact test | ISO 179 | Rosand IFWIT type 5 | −20° C. |
| Notched Charpy Impact test | ISO 179 | Rosand IFWIT type 5 | 23° C. |

Figure 6:
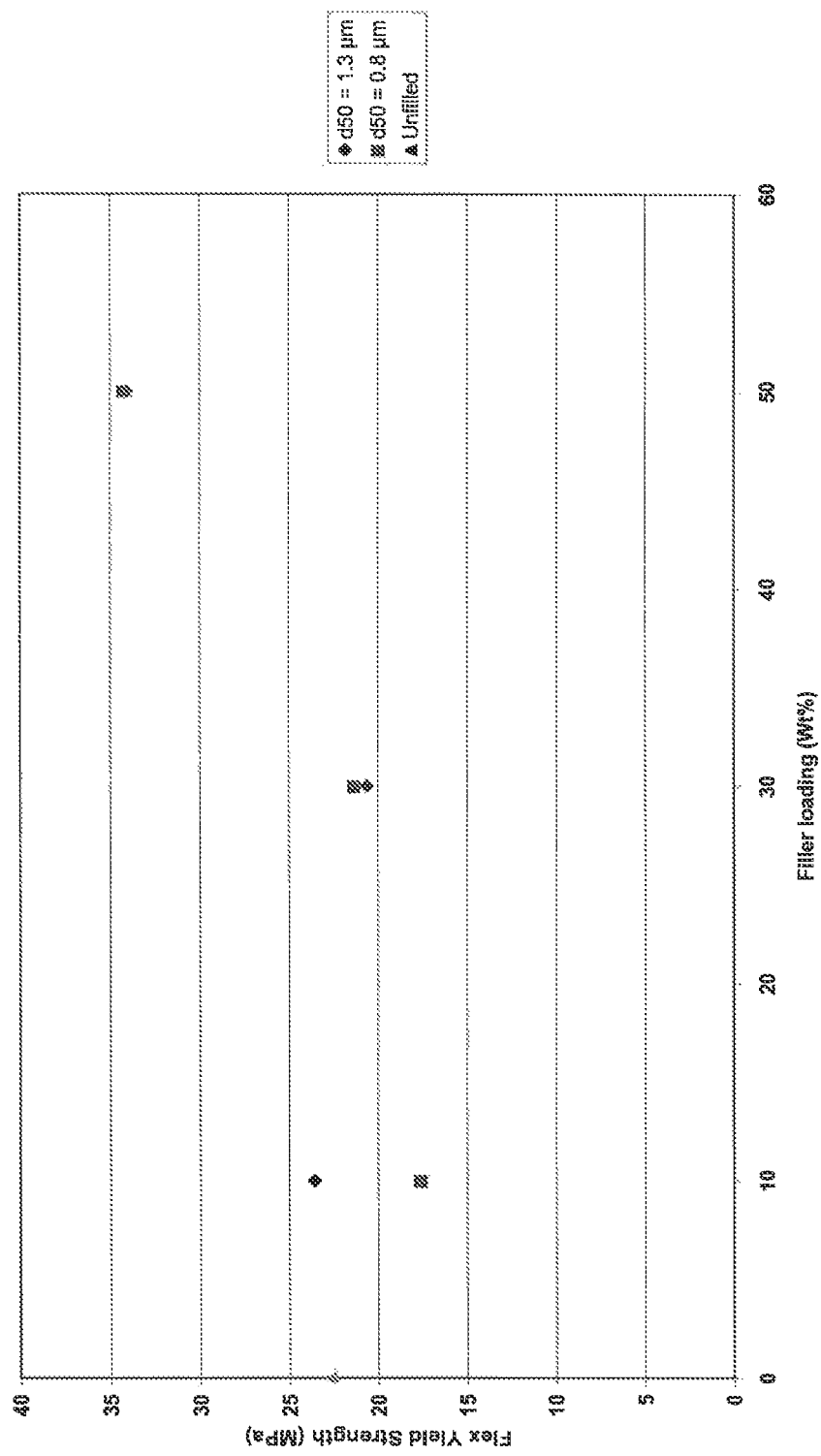
FIG. 6 is graph summarizing flex yield strength of injection moulded test pieces prepared in accordance with Example 2.
Figure 7:
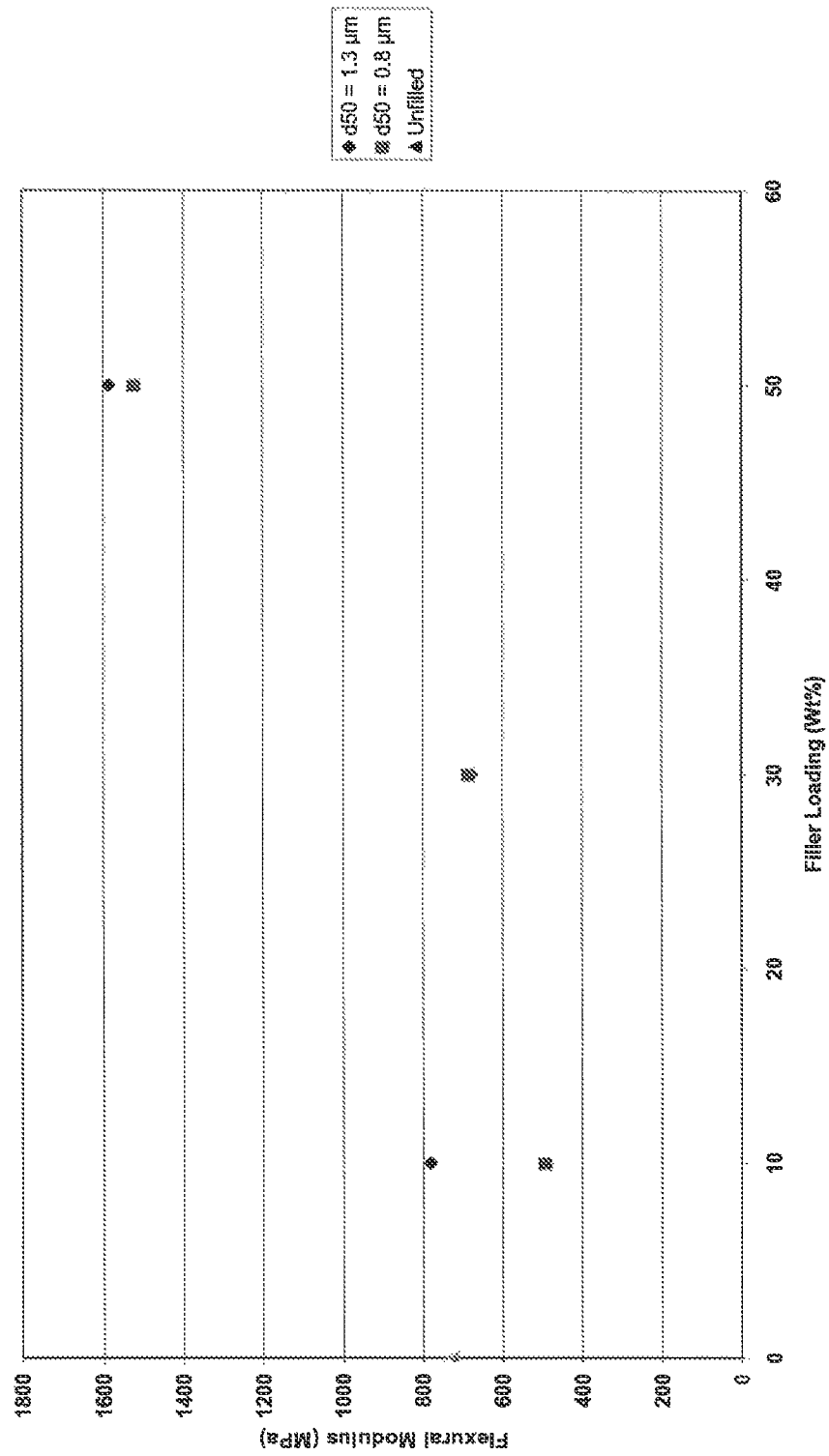
FIG. 7 is a graph summarizing flexural modulus of injection moulded test pieces prepared in accordance with Example 2.
Figure 8:
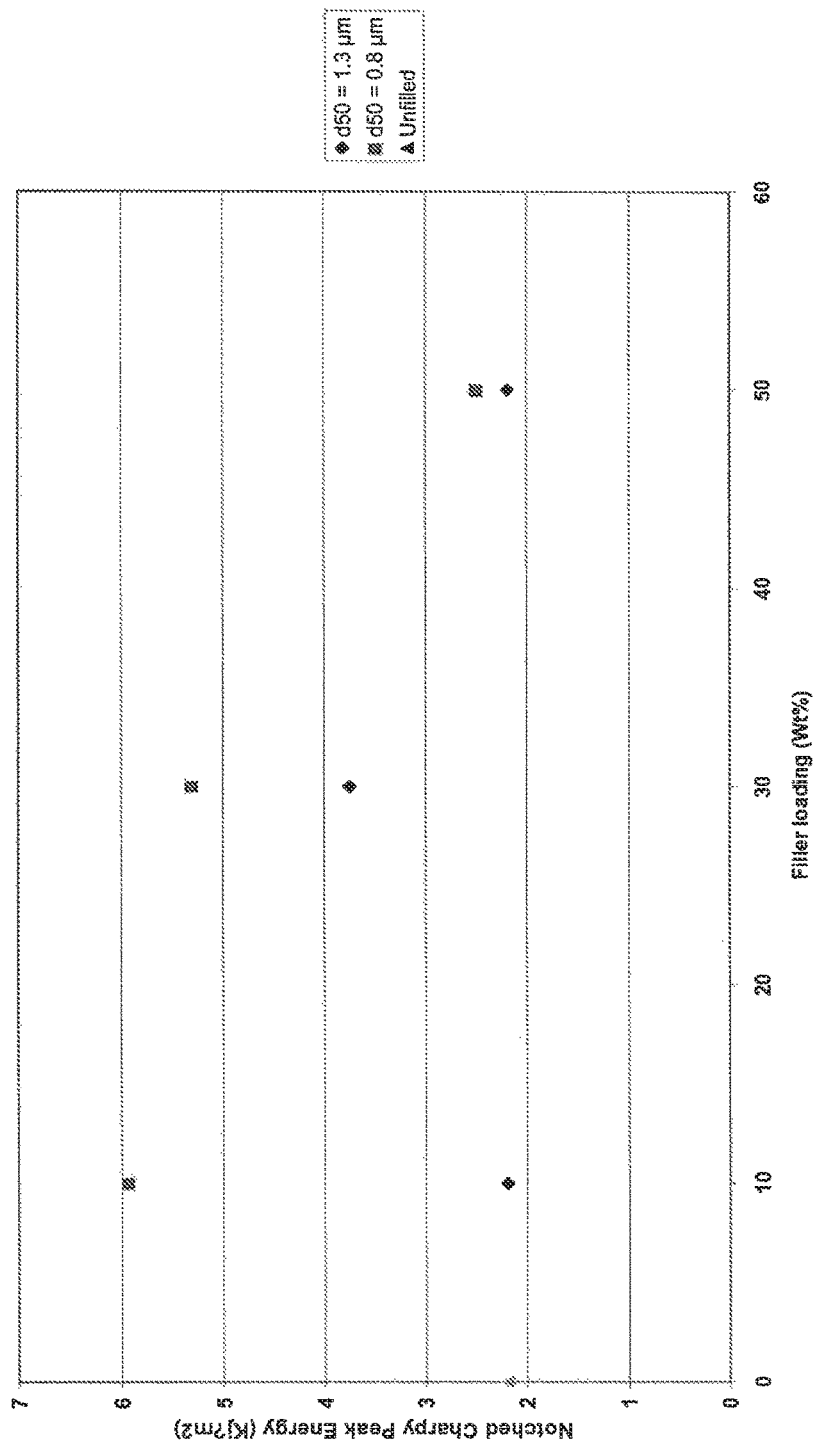
FIG. 8 is a graph summarizing notched Charpy peak energy of injection moulded test pieces prepared in accordance with Example 2

Results are summarized in Table 5 below and FIGS. 6-8.

TABLE 5

| Unnotched Charpy at −20° C. Number of Test Pieces that Did Not Fail | | |
|---|---|---|
| Loading (Wt %) | filler (i) + 0.6 wt % coupling modifier | filler (ii) + 1.1 wt % coupling modifier |
| 0 | 0 | 0 |
| 10 | 0 | 11 |
| 20 | 8 | 9 |
| 30 | 0 | 0 |

The invention claimed is:

1. A functional filler comprising:
an inorganic particulate material, wherein the inorganic particulate material has a $d_{50}$ of less than about 10 μm; and
a coating comprising a first compound including a terminating propanoic group or ethylenic group with one or two adjacent carbonyl groups,
wherein the first compound has the following formula:

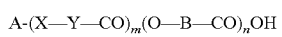

$$A\text{-}(X\text{---}Y\text{---}CO)_m(O\text{---}B\text{---}CO)_nOH$$

wherein:
A is a moiety containing a terminating ethylenic bond with one or two adjacent carbonyl groups;
X is O and m is 1 to 4 or X is N and m is 1;
Y is $C_{1-18}$-alkylene or $C_{2-18}$-alkenylene;
B is $C_{2-6}$-alkylene;
n is 0 to 5;
provided that when A contains two carbonyl groups adjacent to the ethylenic group, X is N.

2. A functional filler according to claim 1, wherein the inorganic particulate has a $d_{50}$ ranging from about 0.5 μm to about 10 μm.

3. A functional filler according to claim 1, wherein the inorganic particulate has a $d_{50}$ ranging from about 0.5 μm to about 2 μm.

4. A functional filler according to claim 1, wherein the inorganic particulate has a $d_{50}$ ranging from about 0.5 to about 1.5 μm.

5. A functional filler according to claim 1, wherein the inorganic particulate is ground calcium carbonate.

6. A functional filler according to claim 1, wherein the first compound is present in the functional filler in an amount ranging from about 0.6 wt. % to about 1.2 wt. %.

7. A functional filler according to claim 1, wherein the inorganic particulate material is selected from the group consisting of: an alkaline earth metal carbonate, sulphate, calcium carbonate, magnesium carbonate, dolomite, gypsum, a hydrous kandite clay, kaolin, halloysite, ball clay, an anhydrous kandite clay, a calcined kandite clay, metakaolin, fully calcined kaolin, talc, mica, perlite, diatomaceous earth, magnesium hydroxide, aluminium trihydrate, and combinations thereof.

8. A functional filler according to claim 1, wherein the inorganic particulate is calcium carbonate, and wherein the functional filler further comprises talc as a secondary filler component.

9. A functional filler according to claim 8, wherein the inorganic particulate is present in the functional filler in amount of at least 80% of the total dry weight of the mixed inorganic particulate and secondary filler component.

* * * * *